US011681417B2

(12) United States Patent
Nair et al.

(10) Patent No.: US 11,681,417 B2
(45) Date of Patent: Jun. 20, 2023

(54) ACCESSIBILITY VERIFICATION AND CORRECTION FOR DIGITAL CONTENT

(71) Applicant: Adobe Inc., San Jose, CA (US)

(72) Inventors: Meera Ramachandran Nair, Bangalore (IN); Manish Kumar Pandey, Gorakhpur (IN); Majji Kranthi Kumar, Totagumuda Village (IN); Mohit Chaturvedi, Delhi (IN); Malkeet Singh, Greater Noida West (IN); Sanjay Kumar Biswas, Yamuna Nagar (IN)

(73) Assignee: Adobe Inc., San Jose, CA (US)

( * ) Notice: Subject to any disclaimer, the term of this patent is extended or adjusted under 35 U.S.C. 154(b) by 57 days.

(21) Appl. No.: 17/078,293

(22) Filed: Oct. 23, 2020

(65) Prior Publication Data
US 2022/0129123 A1 Apr. 28, 2022

(51) Int. Cl.
*G06F 3/00* (2006.01)
*G06F 9/00* (2006.01)
*G06F 17/00* (2019.01)
*G06F 3/0484* (2022.01)

(52) U.S. Cl.
CPC .................. *G06F 3/0484* (2013.01)

(58) Field of Classification Search
CPC .................................................. G06F 3/0484
See application file for complete search history.

(56) References Cited

U.S. PATENT DOCUMENTS

| 6,823,311 | B2* | 11/2004 | Tetsumoto | G10L 13/08 704/260 |
| 7,693,679 | B1* | 4/2010 | Warnke | G01J 5/02 702/132 |
| 10,467,507 | B1* | 11/2019 | Hao | G06K 9/66 |
| 2005/0160065 | A1* | 7/2005 | Seeman | G06F 16/9535 |
| 2007/0094588 | A1* | 4/2007 | Klassen | G06F 16/9577 715/210 |

(Continued)

OTHER PUBLICATIONS

"Email On Acid", retrieved from the Internet: https://www.emailonacid.com/ [coy retrieved Nov. 16, 2020], 8 pages.

(Continued)

*Primary Examiner* — Kieu D Vu
*Assistant Examiner* — Anita D Chaudhuri
(74) *Attorney, Agent, or Firm* — Finch & Maloney PLLC

(57) ABSTRACT

Techniques are disclosed for increasing accessibility of digital content. For instance, a code for the digital content and one or more accessibility guidelines are received. The code is analyzed to identify a violation of an accessibility guideline. The digital content presented in accordance with the code, data indicative of the violation, and an option to correct the violation are displayed on a User Interface (UI). In response to receiving an input indicative of a selection of the option to correct the violation, one or more correction options to correct the violation are provided. In response to a selection of a correction option, the code is altered, based on the selected correction option. The alteration of the code corrects the violation of the accessibility guideline and thereby changes one or more aspects of how the digital content is to be presented.

20 Claims, 15 Drawing Sheets

(56) References Cited

U.S. PATENT DOCUMENTS

| | | | | |
|---|---|---|---|---|
| 2008/0317376 | A1* | 12/2008 | Kasperkiewicz | G06T 5/00 |
| | | | | 382/274 |
| 2009/0113287 | A1* | 4/2009 | Yee | G06F 16/9574 |
| | | | | 715/234 |
| 2009/0319927 | A1* | 12/2009 | Beeman | G06F 40/226 |
| | | | | 715/764 |
| 2018/0060359 | A1* | 3/2018 | Li | G06F 16/24578 |
| 2020/0081927 | A1* | 3/2020 | Sabbavarpu | G06F 16/9577 |

OTHER PUBLICATIONS

"Accessible Email Made Easy: Introducing Accessiblity Checks in Litmus", retrieved from the Internet: https://www.litmus.com/blog/accessible-email-made-easy-introducing-accessibility-checks-in-litmus/ [copy retrieved Nov. 16, 2020], 4 pages.

"Achieve your digital potenial", retrieved from the Internet: https://siteimprove.com/en-us/ [copy retrieved Nov. 16, 2020], 8 pages.

"About . . . —accessible-email.org", retrieved from the Internet: https://www.accessible-email.org/about/ [copy retrieved Nov. 16, 2020], 2 pages.

"Web Content Accessibilty Guidelines", retrieved from the Internet: https://en.wikipedia.org/wiki/Web_Content_Accessibility_Guidelines [copy retrieved Nov. 16, 2020], 8 pages.

* cited by examiner

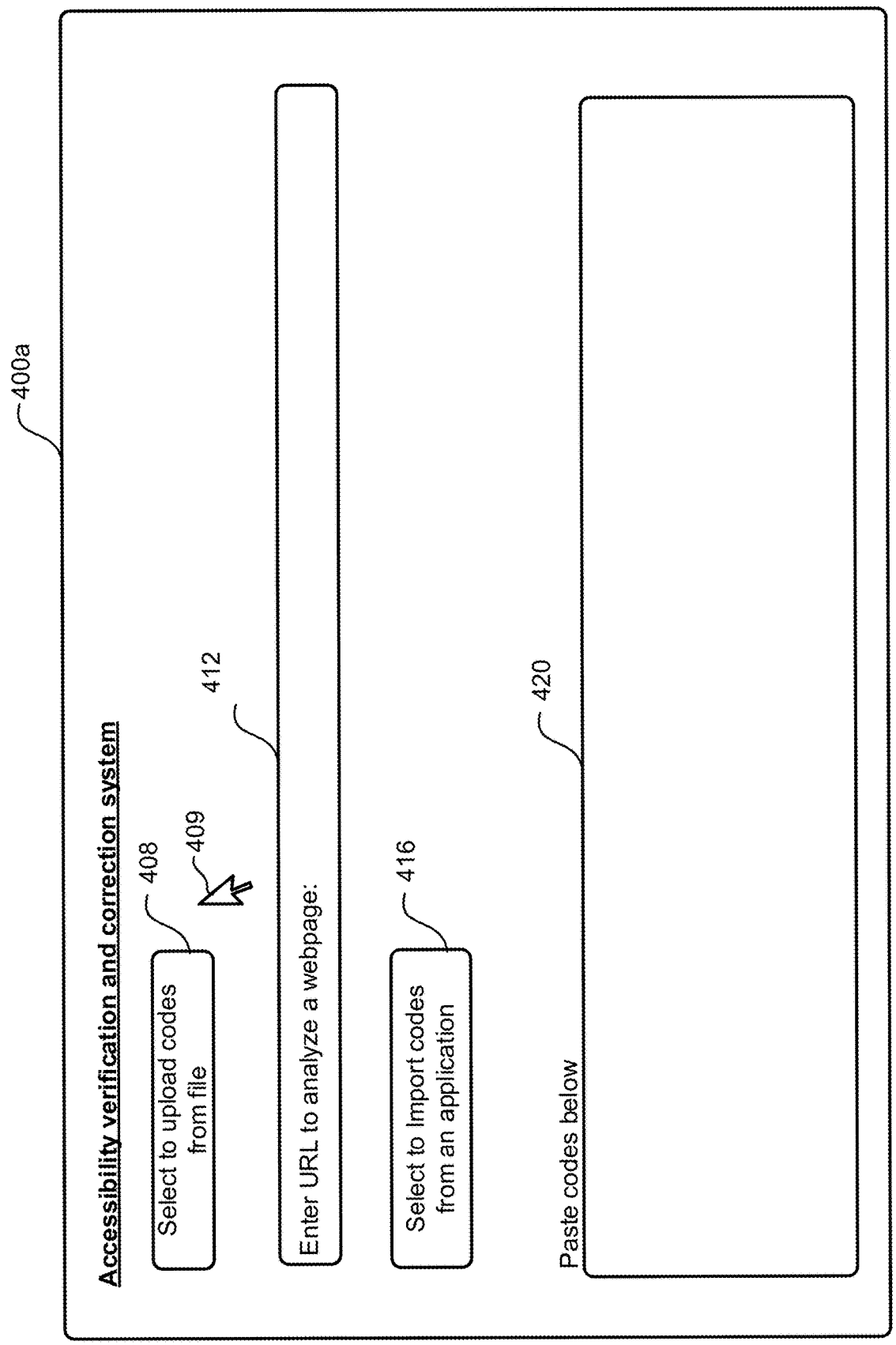

Accessibility report 427

| Sr. No. | Severity | Violation | Description |
|---|---|---|---|
| 1 | Critical | Button 426c must have discernible text | The button 426a does not have any discernable text, and a text-to-speech synthesis software may not be able to describe the function of this button |
| 2 | Serious | Insufficient spacing between lines in text 426b | Because of the insufficient spacing, a partially blind or dyslexic reader may find it difficult to read the text |
| 3 | Serious | Not sufficient contrast between color of button 426c and background | Because of the insufficient contrast, a partially blind reader may find it difficult to readily discern or identify the button 426c from the background |

Accessibility Score 86.00

FIG. 4D1

ACCESSIBILITY VERIFICATION AND CORRECTION FOR DIGITAL CONTENT

FIELD OF THE DISCLOSURE

This disclosure relates generally to accessibility of digital content, and more specifically to techniques for verification and correction of violations to accessibility guidelines.

BACKGROUND

Approximately 10-15% of world population has some form of disability, which prohibits at least some of them from consuming digital content in a satisfactory manner. Thus, accommodations can be made to improve the accessibility of that content to a given consumer. For example, a blind or partially blind person may use a screen reader, such as a speech-to-text synthesizer, to consume digital content. In another example, a partially blind person, a partially color-blind person, and/or a dyslexic person may find it easier to consume digital content that has relatively large font size, appropriate spacing between words, lines, and paragraphs, and/or has text color that is sufficiently contrasted from background color.

Several accessibility guidelines exist, which aim to make digital content more accessible to people having one or more forms of disabilities. For example, the Web Content Accessibility Guidelines (WCAG) are part of a series of web accessibility guidelines published by the Web Accessibility Initiative (WAI) of the World Wide Web Consortium (W3C), the main international standards organization for the Internet. These guidelines are a set of recommendations for making Web content more accessible, primarily for people with disabilities, but also for various user agents, including highly limited devices, such as mobile phones and tablets. The WCAG guidelines (for example, WCAG version 2.1 guidelines) include multiple accessibility guidelines. Verification of compliance with such accessibility guidelines, as well as correction of violations to such accessibility guidelines, is a non-trivial task, and is seemingly an overlooked area of technology. To this end, there is a significant barrier to entry for those wishing to make their content more accessible to a broader range of consumers.

SUMMARY

Techniques are disclosed for identifying, within digital content, violations of accessibility guidelines and correcting such violations. For example, a method for increasing accessibility of digital content comprises accessing a code for digital content and an accessibility guideline. The code defines one or more aspects of how the digital content is to be presented, and the accessibility guideline is a rule with which the presentation of the digital content is to comply. The presentation may be, for example, visual (e.g., via a display), tactile (e.g., via a Braille machine), or aural (e.g., via a loud speaker), to name a few examples. The code is analyzed to identify a violation of the accessibility guideline. The digital content presented in accordance with the code is displayed on a first area of a User Interface (UI), data indicative of the violation is displayed on a second area of the UI, and an option to correct the violation is displayed on a third area of the UI. In response to receiving an input indicative of a selection of the option to correct the violation, one or more correction options to correct the violation are provided. In response to receiving a selection of a correction option, the code is altered, based on the selected correction option, to correct the violation of the accessibility guideline and thereby change one or more aspects of how the digital content is to be presented. In some such example cases, an accessibility score indicative of a severity of the violation is calculated prior to the alteration of the code, and the accessibility score is displayed on a fourth area of the UI. In response to altering the code, the accessibility score is updated to reflect the altered code, and the updated accessibility score is displayed on the fourth area of the UI. The methodology may be implemented, for instance, in a processor-based system, or in a computer program product that includes one or more machine-readable mediums encoded with instructions that when executed by one or more processors cause the methodology to be carried out.

BRIEF DESCRIPTION OF THE DRAWINGS

FIGS. 4A, 4B, 4C, 4D, 4D1, 4E, 4F, 4G, and 4H illustrate images depicting various operations discussed with respect to the example methodology of FIGS. 3A-3B, in accordance with some embodiments of the present disclosure.

DETAILED DESCRIPTION

Figure 1:
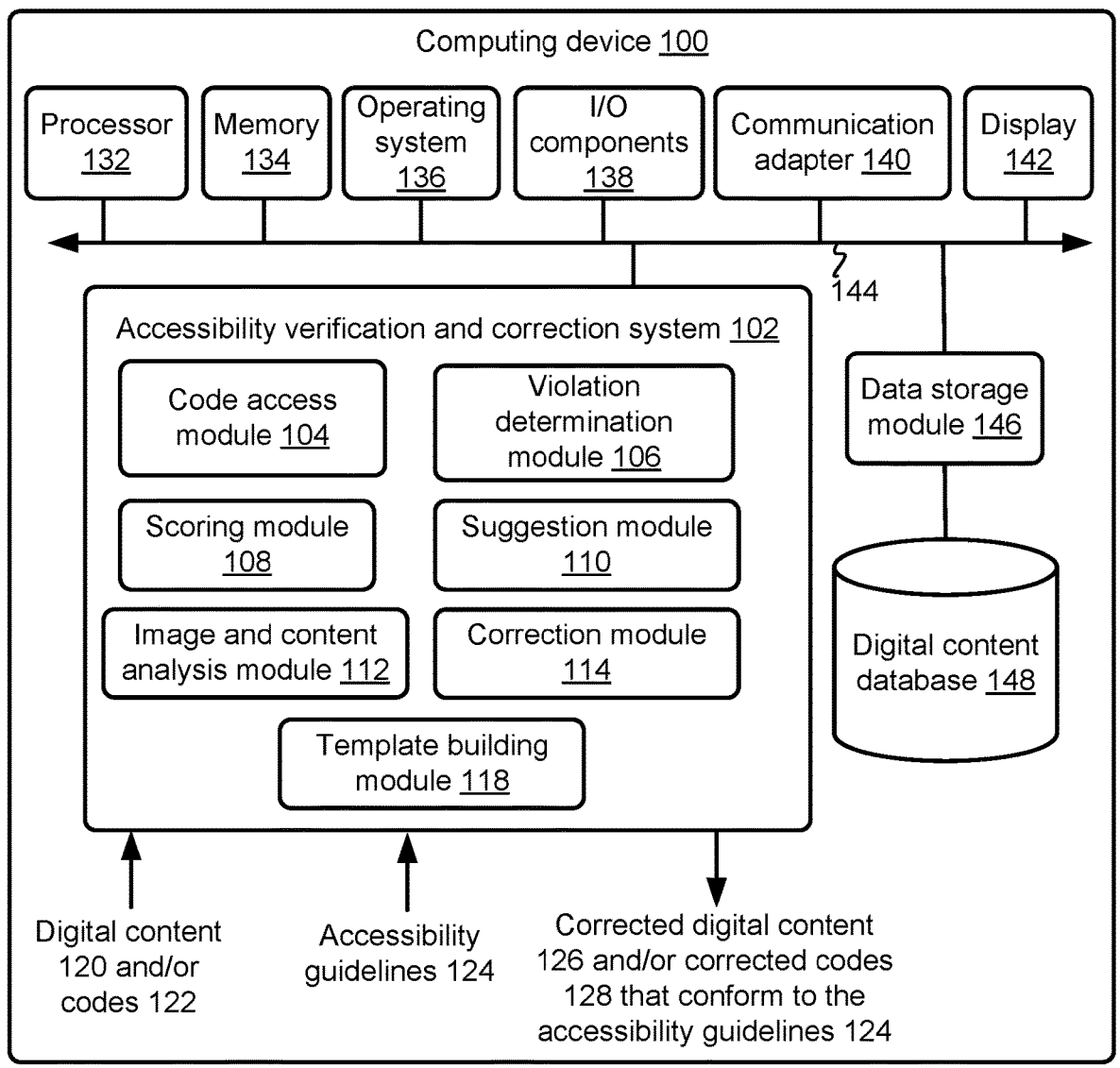
FIG. 1 is a block diagram illustrating selected components of an example computing device configured to verify conformance of digital content to one or more accessibility guidelines, and correct possible violations of the accessibility guidelines, in accordance with some embodiments of the present disclosure.

Techniques are disclosed for verifying conformance of digital content to one or more accessibility guidelines, and correcting possible violations of the accessibility guidelines. For example, an accessibility verification and correction system (also referred to herein as "system") checks for compliance of digital content to the accessibility guidelines, and allows for correction of violations, if any. For example, the accessibility verification and correction system analyzes codes that define one or more aspects of how the digital content is to be presented, such as content to be presented visually (e.g., in a website), tactilely (e.g., by a Braille machine), and/or aurally (e.g., by a screen reader comprising a text-to-speech application). The techniques can be used to analyze any types of codes, including Hypertext Markup Language (HTML) codes.

Once a violation of an accessibility guideline is detected by the system, the system provides one or more correction options to correct to the violation, and in some such embodiments may provide a recommended correction option to correct the violation. The developer of the codes can either select a system-recommended correction option, or otherwise select from the plurality of available correction options. Irrespective of whether the developer chooses a system-recommended correction option or manually selects a correction option, the codes are automatically altered by the system (i.e., the developer does not have to manually alter the codes), either using the system-recommended correction option or the developer-selected correction option. Thus, the developer can use the system to not only check for violations of various accessibility guidelines, but to also correct any violations found using the same system. Accordingly, the developer does not need to painstakingly go through the entire code to correct the violations with a sufficient understanding of the accessibility guidelines—rather, the system internalizes the guideline complexities and corrects violations, thereby making the accessibility compliance tasks a relatively easy one.

Term Definition

As used herein, the term "accessibility" refers to the ability of digital content to be consumed via a person having one or more conditions that impede that person's ability to consume digital content presented in a non-accessible manner. For instance, digital content that is only displayed on a standard display screen is not accessible to a blind person without some further accommodation, but an aurally presented version of that digital content is accessible to the blind person. Similarly, digital content that is only aurally presented on a loud speaker is not accessible to a deaf person without some further accommodation, but a visually presented version of that digital content is accessible to the deaf person. Numerous such accommodations to improve accessibility of content can be used in conjunction with the techniques provided herein, as will be appreciated.

As used herein, a "code for digital content" is a code that defines one or more aspects of how the digital content is to be presented for consumption by a user. The presentation may be, for example, visual (e.g., via a standard display), tactile (e.g., via a Braille display), or aural (e.g., presentation via a loud speaker). The codes may comprise any number of standard or proprietary programming language codes, such as Hypertext Markup Language (HTML) codes, Cascading Style Sheets (CSS) codes, scripting language codes such as JavaScript codes, or other types of language that facilitate a machine-human interface (such as a code that defines signals to be communicated directly to a user's brain). Numerous such coding schemes that can be manipulated to improve accessibility of content can be used in conjunction with the techniques provided herein, as will be appreciated.

As used herein, an "accessibility guideline" is a rule with which the presentation of digital content is to comply, so as to make that digital content more accessible for at least some users. Example such guidelines include the Web Content Accessibility Guidelines (WCAG) published by the Web Accessibility Initiative (WAI). Example guidelines to improve accessibility include, for instance: a speed threshold for aural presentation of textual content extracted from an audio file to be consumed by a blind person; a selective color scheme for visual presentation of visual graphics content to be consumed by a color blind person; an emotion or background noise indicator for textual presentation of audio content extracted from an video file to be consumed by a deaf person; and a letter/line spacing scheme for presentation of textual content to be consumed by a dyslexic person. Numerous such accommodations to improve accessibility of content can be used in conjunction with the techniques provided herein, as will be appreciated.

As used herein, an "accessibility score" is indicative of a severity and/or number of detected accessibility guideline violation, with respect to digital content to be presented for consumption. In some example cases, the accessibility score is numerical (e.g., the lower the score, the greater the severity of the violation). Alternatively, or in addition, the accessibility score can be represented using informative categories, as critical, serious, moderate, and minor. The accessibility score can be improved by changing the code for the digital content, such that the accessibility of the content improves for at least some users. Such a score brings awareness and light to the complexity to accessibility, and can help developers develop more accessible content, as will be appreciated.

General Overview

As noted above, there exist accessibility guidelines to make digital content more accessible to disabled users of the digital content. For example, WCAG 2.1 was initiated in June 2018 with the goal to improve accessibility guidance for three major groups: users with cognitive or learning disabilities, users with low vision, and users with disabilities on mobile devices. Ensuring that digital content adheres to such accessibility guidelines is a non-trivial task, and is a worthwhile area for development.

Thus, techniques are provided herein for verifying conformance of digital content to one or more accessibility guidelines, and facilitating correction of possible violations of the accessibility guidelines. For example, an accessibility verification and correction system (also referred to herein simply as a "system") checks for compliance of digital content to the accessibility guidelines, and detects possible violations. As will be discussed in further detail below, according to some such embodiments, the system assigns an accessibility score to the digital content, where the accessibility score is indicative of a severity and/or a number of any detected violations of accessibility guidelines. Additionally, the system allows the developer to the view the current version of the digital content, the accessibility score, the violation(s), and options to correct the violations in corresponding different areas of a same User Interface (UI). In some such examples, the system further allows the developer to view and select one or more correction options suitable for correcting the violations. A correction option, for example, comprises one or more attributes that, when used to replace corresponding original attributes within the code, would correct a corresponding accessibility guidelines violation. In some examples, the codes are automatically altered by the system (the developer does not have to manually alter the codes), using the selected correction options. In some embodiments, the system further updates the accessibility score, to indicate how the accessibility of the digital content has improved after altering the codes. Thus, the developer can use the system to not only check for violations of various accessibility guidelines, but to also correct the violations using the same system. Accordingly, the developer does not need to painstakingly analyze the entire code to correct the violations—rather, the system corrects the violations using attributes auto-selected by the system and/or attributes selected manually by the developer, according to some embodiments.

In further details, in some examples, the system (such as a code access module within the system) accesses codes for digital content and a plurality of accessibility guidelines. The codes define one or more aspects of how the digital content is to be presented, such as visually and/or aurally. The codes can be of any appropriate type. In some examples, the codes comprise Hypertext Markup Language (HTML) codes, which define one or more aspects of how the digital content are presented visually (e.g., in a web page) and/or are presented aurally (e.g., read aloud by a screen reader). In some other examples, the codes comprise another appropriate programming language, such as Cascading Style Sheets (CSS), scripting languages such as JavaScript, or other types of language.

The digital content, in some examples, includes marketing emails and/or marketing brochures that a marketer intends to send to its customer base. Prior to sending the marketing emails and/or marketing brochures, the marketer uses the system to make sure that the marketing emails and/or marketing brochures adhere to accessibility guidelines, such that a disabled customer does not have difficulty in accessing the digital content. In some other examples, the digital content includes other types of emails and/or brochures, content of a webpage, including a landing page of a website, digital presentations, a rich text document, a spreadsheet document, a Portable Document Format (PDF) document, an audio file, a video, and/or any other appropriate type of digital content that a disabled person can access.

In some embodiments, the system provides a User Interface (UI). The UI can be launched within a web browser, or via an application installed on a computing device. The accessibility verification and correction system can access the codes in one of many different manners. In some examples, the UI provides an option to upload the codes for the digital content from a file that is stored locally within a computing device, or stored remotely such as in the cloud or in the remote digital content database. In some other examples, the UI also provides an option to upload a link to the content being analyzed for accessibility, such as a Uniform Resource Locator (URL) for a website or a webpage. When a developer (e.g., who is a developer of the digital content and/or possibly the codes) enters the URL or the web address of the webpage, the system accesses the codes associated with the webpage. In yet some other examples, the UI also provides an option to import codes to be analyzed from an application (e.g., an application used to program the codes). In some further examples, the UI also provides an option to paste the codes within a space provided in the UI. For example, the developer can copy the codes from an appropriate file and paste the codes in the area provided within the UI.

In some such examples, when the developer selects an option to analyze the codes, another UI is presented by the system. The digital content is rendered and presented in accordance with the codes within a first area of this UI. In some examples, the UI also illustrates default accessibility guidelines (such as the WCAG 2.1 accessibility guidelines) with which the system is to adhere, although the developer can select any other appropriate accessibility guidelines by interacting with the UI. For example, the developer can select another version (e.g., newer or older version than version 2.1) of the WCAG accessibility guidelines, or can select other appropriate accessibility guidelines, and/or can create accessibility guidelines.

In some examples, the system (such as a violation determination module within the system) analyzes the codes, to identify one or more violations of one or more accessibility guidelines. The UI displays the one or more violations of accessibility guidelines. In some examples, the violations are categorized as critical violations, serious violations, moderate violations, and minor violations (although other violation categories may be used in some other examples). As the names suggest, the critical violations are more severe than the serious violations, which are in turn more severe than the moderate violations, and so on. Categorizing the violations into multiple categories helps provide the developer with an understanding of criticality or severity of the violations, so that the developer can choose to fix more severe ones and possibly ignore the less severe ones (or fix all the violations), if the developer chooses to do so.

So, for instance, assume in one example use case that a first violation, which is a critical violation, and two serious violations are identified. The first violation is, for example, a critical violation regarding absence of discernable text associated with a clickable or otherwise selectable button or other such user interface feature within the digital content. For example, the codes of the digital content may not include any discernable text for this button. The violation determination module checks the codes, to identify that the button does not have any associated discernable text. Typically, when a non-disabled user views the button, the user identifies the function of the button based on a logo, one or more words, and/or graphics associated with or included within the button. However, text-to-speech synthesis tools, such as those used by blind or partially blind users, may not be able to discern any graphical representation of words or icons on the button (e.g., because the text is graphical only, and not tagged as discrete text). In such cases, because the button lacks discernable text, the text-to-speech synthesis tool cannot provide any conveyable description for the button. This is an example of a critical violation of a corresponding accessibility guideline, as the button is inaccessible to the blind user.

Continuing with the example use case, further assume that the second violation is a serious violation regarding insufficient spacing between lines in texts within a text box of the digital content. For example, the codes may provide a line spacing of 0.9, whereas the accessibility guidelines call for a minimum line spacing of 1.0 Accordingly, the violation determination module checks the codes, to identify that the line spacing in the text within the text box is less than a minimum threshold line spacing specified by the corresponding accessibility guideline. A partially blind or a dyslexic user may find it difficult to read the text within the box, due to the insufficient line spacing. In this example, the example attribute associated with line spacing is set at 0.9, which violates a corresponding minimum line spacing guideline of the accessibility guidelines. Note that if the 0.9 were 0.4 instead, such a violation may be designated critical.

Continuing with the example use case, further assume that the third violation is a serious violation regarding insufficient contrast between colors of a button and its background within the digital content. For example, the background on which the button is located may be light grey, whereas the button can be dark grey, thereby creating insufficient color contrast between the two. A partially blind user or a color-blind user may find it difficult to readily identify and distinguish the button from its background. The violation determination module checks the codes, to identify that color contrast of two overlapping elements are insufficient, thereby identifying the third violation.

In some embodiments, the developer can choose to download an accessibility report, which lists the violations identified by the violation determination module. The accessibility report includes, in some examples, an identification of the violations, a brief explanation of the violations, and a severity category of the violations (e.g., whether a violation is a critical violation, a serious violation, and so on).

In some examples, the system displays (e.g., simultaneously displays) (i) the digital content presented in accordance with the codes on a first area of a UI, (ii) data indicative of the one or more violations on a second area of the UI, (iii) an accessibility score on a third area of the UI, and (iv) one or more options to correct the one or more violations on a fourth area of the UI.

For example, according to some such embodiments, a scoring determination module of the system calculates and causes display of an accessibility score indicative of a number and/or severity of the one or more violations identified by the system. The developer can determine how accessible the digital content is to the end customers, based on the accessibility score. For example, individual violations are categorized into example categories, such as critical, serious, moderate, and/or minor, to make the developer of the digital content understand how important it is to fix individual violations, depending on their corresponding severity. In some examples, a violation is weighted depending on an associated severity of the violation. For example, a critical violation has more impact on the score than a serious violation, a serious violation has more impact on the score than a moderate violation, and a moderate violation has more impact on the score than a minor violation.

In some examples, the above discussed one or more options to correct the violations include: (i) an auto-selection of correction options and (ii) a manual-selection of correction options. For an individual violation (or for all the violations), the developer can choose one of these two options. For example, the auto-selection option is to correct the violations using alternative attributes or correction options recommended by the system. Thus, if the auto-selection option is selected by the developer, the system (such as a suggestion module of the system) recommends a correction option, without needed a selection of a correction option from the developer.

On the other hand, the manual-selection option is for manual selection of correction options, to correct the violations using alternative attributes provided or selected by the developer of the codes. For example, if the manual-selection option is selected, the suggestion module provides multiple correction options, and the developer can select a correction option.

For examples, recall the first example violation associated with a button missing discernable text. To cure this violation and assuming a selection of the manual-selection option, the suggestion module provides correction options to correct this violation. For instance, a correction window provides an option to the developer to enter new discernable text that is to be associated with the button. The correction window also provides another option to the developer of the codes to use a system generated (or system recommended) discernable text, which is, merely as an example, "This button is for downloading the photo-viewing app." If the manual-selection option is selected, the developer of the code can either select the system recommended discernable text associated with the button, or can enter new discernable text via the window. If, on the other hand, the auto-selection option is selection, the system directly selects the system recommended discernable text.

In some examples, once the correction options for the violations are selected (either auto-selected or manually selected), the system (e.g., a correction module of the system) alters the codes based on the selected correction options, to correct one or more violations of the accessibility guideline. For example, assume that the developer selected the system recommended correction option for the above discussed first violation, e.g., the discernable text "This button is for downloading the photo-viewing app" from the first correction window. Furthermore, assume that the developer selected a line spacing of 1.25 for the above discussed second violation. Based on such a selection of the correction options, the correction module of the system alters the codes, to associate the discernable text with the button.

The alterations of the codes change one or more aspects of how the digital content is to be presented. For example, now the text within the text box is displayed with an increased spacing of 1.25 (e.g., based on the selection to correct the second violation). Similarly, when screen reader users, such as blind or partially blind users, use a text-to-speech synthesis tool to read the digital content, the button graphic would now be aurally presented by the text-to-speech synthesis tool as "This button is for downloading the photo-viewing app," based on association of the discernable text with the button.

In some such examples, the system (e.g., the scoring module) updates the accessibility score, to show how the alteration of the codes positively impact the accessibility score. For example, because the violations are now corrected, the accessibility score increases, thereby indicating an increase in accessibility of the digital content.

In some such examples, the system can also provide recommendation to change an image of the digital content and/or alternate text associated with the image, to improve accessibility to the digital content. For example, an image and content analysis module of the system determines that an original image and/or an original alternate text associated with the original image violates accessibility guidelines. Merely as an example, the original image having a white background can also violate a corresponding accessibility guideline, or lower the accessibility score. In some examples, the original image has a lower resolution and/or a smaller size, which can violate an accessibility guideline. In some other examples, the original image has text written on the image (e.g., as determined by optical character recognition performed on the image), which can decrease a viewability of the written texts and/or viewability of the image, or simply go undetected (and thus be inaccessible). In some such examples, due to one or more of the above discussed factors, the system determines that it may be desirable to replace the original image with an alternative image, or to tag the image with a text label indicating the text written on the image, as extracted via an OCR process.

Image processing can be used to improve the accessibility of an image. For example, the image and content analysis module of the system performs image recognition operations, to identify one or more components within the image of the digital content. Merely as an example and as will be discussed in turn, the image and content analysis module of the system can recognize that the image includes a pizza, such as a cheese pizza, with one slice partially removed. The image and content analysis module of the system generates one or more keywords associated with the image, based on identifying the one or more components within the image. For example, in the context of the above discussed example image, the system generates one or more keywords, such as pizza, cheese pizza, a cheese pizza with a slice partially removed, and/or food.

In some embodiments, the image and content analysis module comprises a machine learning module, such as a trained neural network. For example, the neural network is pre-trained to analyze images and identify components or features within the images. Any appropriate neural network capable of image identification can be used. The neural network can also be pre-trained and used to generate keywords for an image, and/or recommend images and/or alternate texts to replace the original image and/or the original alternate text, as discussed herein.

The system (such as a suggestion module of the system) recommends, based on the one or more key words, one or more images to replace the original image and/or alternate text for the image. For example, the suggestion module searches one or more image databases to find at least one recommended image, which can be used as an alternative to the original image. In another example, the suggestion module generates and recommends descriptive alternate texts using the generated keywords (and/or keywords extracted via the image processing, such as OCR). For example, an example alternate text can be: "This is an image of a cheese pizza, with one slice partially removed." In some embodiments, an accessibility score associated with the recommended image and/or the recommended alternate texts are higher than those generated for the original image and/or the original alternate text. The developer can choose to select the recommended image and/or the recommended alternate text, or choose to use the original image and/or the original alternate text, as discussed in further detail herein in turn. In some instances, if the developer selects the recommended image and/or the recommended alternate text, the system alters the associated codes, to reflect the new image and/or the new alternate text.

Also discussed herein are techniques for creating an accessibility guidelines compliant template for drafting digital documents. For example, the system (such as a template building module of the system) builds or generates a template for drafting digital documents. The template can include space-holder components, such as empty textboxes and forms, and/or space for inserting images, that a user can later use to draft a digital document. The template can be used for drafting marketing emails, marketing brochures, web pages, or any other appropriate digital content. The developer can generate many different templates, each having its unique layout. When a user is to draft a digital document, the user can select from one of these layouts, and use the corresponding template to draft the digital document. The system (such as the template building module) sets a range of attributes for one or more parameters of the template, such that the range conforms to one or more corresponding accessibility guidelines. The accessibility guidelines used can be any appropriate accessibility guidelines, such as WCAG accessibility guidelines (e.g., WCAG 2.1 accessibility guidelines, or any versions thereof).

For example, a line spacing less than 1.0 can violate an accessibility guideline. So, the line spacing parameter in the template can be set to have a minimum value of 1.0, and a user using the template to draft a digital document cannot select a line spacing of less than 1.0. Accordingly, digital documents drafted using this template cannot have a violation associated with less-than-minimum line spacing. After the template is built, a user can use the template to draft digital documents. For example, the user can populate the space-holder text block of the template with texts of digital content being drafted. As discussed, the template has attributes that adhere to the accessibility guidelines, and hence, the digital document drafted using the template also adheres to the accessibility guidelines. The system can also verify that the drafted digital document adheres to the accessibility guidelines, and correct violations, if any.

System Architecture

FIG. 1 is a block diagram schematically illustrating selected components of an example computing device 100 (also referred to as device 100) configured to verify conformance of digital content to accessibility guidelines, and correct possible violations of the accessibility guidelines, in accordance with some embodiments of the present disclosure. As can be seen, the device 100 includes an accessibility verification and correction system 102 (also referred to as system 102), which allows the device 100 to verify that digital content conforms to one or more accessibility guidelines, and correct violations of the accessibility guidelines, if any.

For example, as will be discussed in further detail in turn, the accessibility verification and correction system 102 receives a digital content 120 and/or codes 122, where the codes 122 define one or more aspects of how the digital content is to be presented. The accessibility verification and correction system 102 also receives accessibility guidelines 124, which are accessibility related rules with which the presentation of the digital content 120 is supposed to comply. The accessibility verification and correction system 102 checks for possible violations of the accessibility guidelines 124 within the digital content 120 and/or the codes 122, and corrects one or more such violations. The accessibility verification and correction system 102 outputs corrected digital content 126 and/or corrected codes 128 that conform to the accessibility guidelines 124, as will be discussed in further detail in turn.

As will be appreciated, the configuration of the device 100 may vary from one embodiment to the next. To this end, the discussion herein will focus more on aspects of the device 100 that are related to verification of conformance to accessibility guidelines, and correction of any violations of the accessibility guidelines, and less so on standard componentry and functionality typical of computing devices. The device 100 comprises, for example, a desktop computer, a laptop computer, a workstation, an enterprise class server computer, a handheld computer, a tablet computer, a smartphone, a set-top box, a game controller, and/or any other computing device that can verify conformance of digital content to accessibility guidelines, and correct possible violations of the accessibility guidelines.

In the illustrated embodiment, the device 100 includes one or more software modules configured to implement certain functionalities disclosed herein, as well as hardware configured to enable such implementation. These hardware and software components may include, among other things, a processor 132, memory 134, an operating system 136, input/output (I/O) components 138, a communication adaptor 140, data storage module 146, and the accessibility verification and correction system 102. A digital content database 148 (e.g., that comprises a non-transitory computer memory) stores at least digital content 120, codes 122, accessibility guidelines 124, corrected digital content 126, and/or corrected codes 128, and is coupled to the data storage module 146. A bus and/or interconnect 144 is also provided to allow for inter- and intra-device communications using, for example, communication adaptor 140. In some embodiments, the device 100 includes a display screen 142 (referred to simply as display 142), although in some other embodiments the display 142 can be external to and communicatively coupled to the device 100. Note that in an example, components like the operating system 136 and the accessibility verification and correction system 102 can be software modules that are stored in memory 134 and executable by the processor 132. In an example, at least sections of the accessibility verification and correction system 102 can be implemented at least in part by hardware, such as by Application-Specific Integrated Circuit (ASIC) or microcontroller with one or more embedded routines. The bus and/or interconnect 144 is symbolic of all standard and proprietary technologies that allow interaction of the various functional components shown within the device 100, whether that interaction actually takes place over a physical bus structure or via software calls, request/response constructs, or any other such inter and intra component interface technologies, as will be appreciated.

Processor 132 can be implemented using any suitable processor, and may include one or more coprocessors or controllers, such as an audio processor or a graphics processing unit, to assist in processing operations of the device 100. Likewise, memory 134 can be implemented using any suitable type of digital storage, such as one or more of a disk drive, solid state drive, a universal serial bus (USB) drive, flash memory, random access memory (RAM), or any suitable combination of the foregoing. Operating system 136 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also includes one or more I/O components 138, such as one or more of a tactile keyboard, the display 142, a mouse, a touch sensitive or a touch-screen display (e.g., the display 142), a trackpad, a microphone, a camera, scanner, and location services. In general, other standard componentry and functionality not reflected in the schematic block diagram of FIG. 1 will be readily apparent, and it will be further appreciated that the present disclosure is not intended to be limited to any specific hardware configuration. Thus, other configurations and subcomponents can be used in other embodiments.

Also illustrated in FIG. 1 is the accessibility verification and correction system 102 implemented on the device 100. In an example embodiment, the system 102 includes a code access module 104, a violation determination module 106, a scoring module 108, a suggestion module 110, an image and content analysis module 112, a correction module 114, and a template building module 118, each of which will be discussed in detail in turn. In an example, the components of the system 102 are in communication with one another or other components of the device 100 using the bus and/or interconnect 144, as will be discussed in further detail in turn. The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the accessibility verification and correction system 102 may be implemented in any application that allows verification of conformance to accessibility guidelines and correction of any violations, including, but not limited to, ADOBE® SENSEI®, ADOBE® EXPERIENCE MANAGER® (AEM), ADOBE® CREATIVE CLOUD®, ADOBE® CAMPAIGN®, and ADOBE® AFTER EFFECTS® software. "ADOBE," "ADOBE SENSEI", "ADOBE EXPERIENCE MANAGER", "ADOBE CREATIVE CLOUD", "ADOBE CAMPAIGN," and "ADOBE AFTER EFFECTS" are registered trademarks of Adobe Inc. in the United States and/or other countries.

Figure 2:
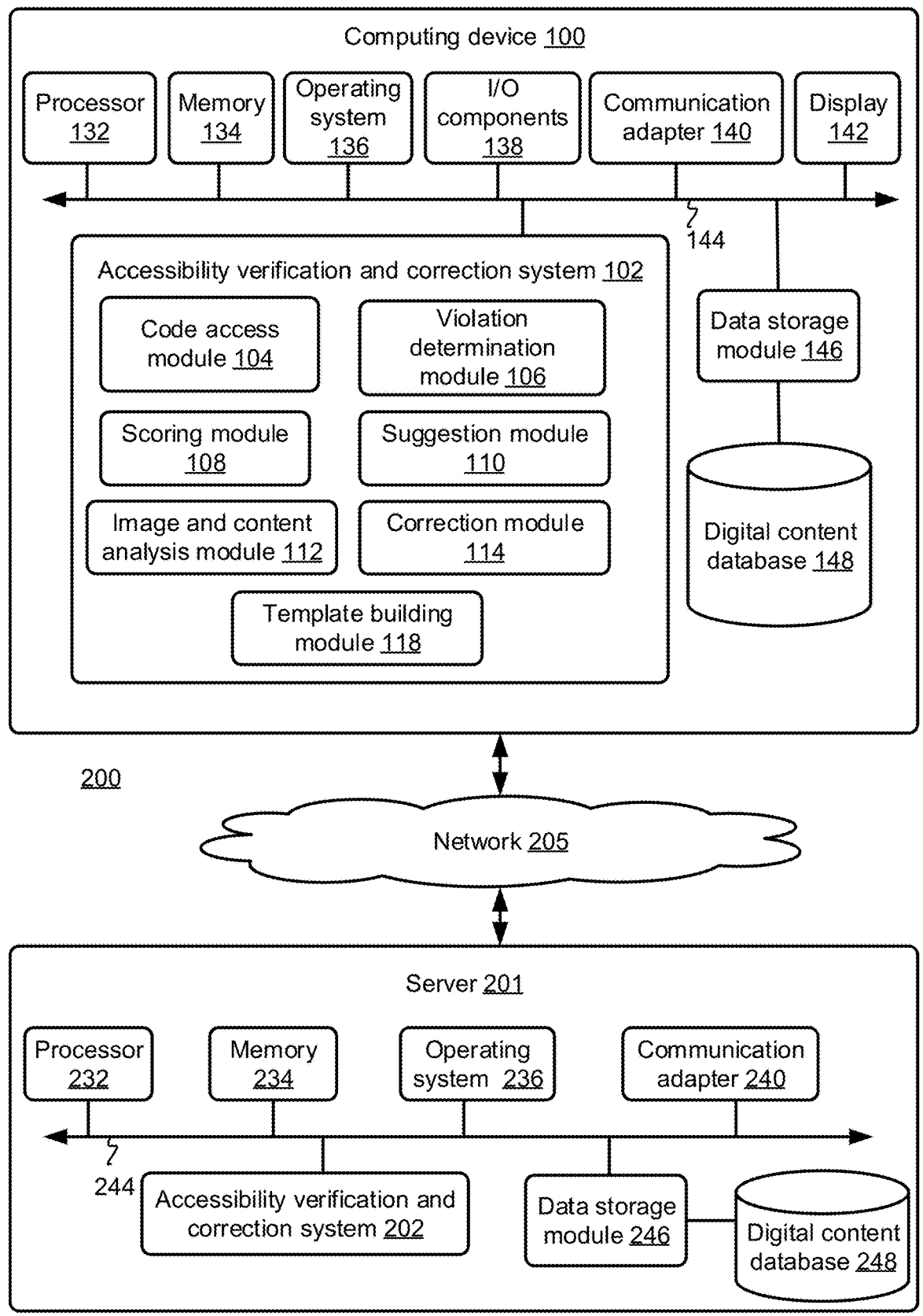
FIG. 2 is a block diagram illustrating selected components of an example system comprising the computing device of FIG. 1 communicating with server device(s), where the combination of the computing device and the server device(s) are configured to verify conformance of digital content to one or more accessibility guidelines, and correct possible violations of the accessibility guidelines, in accordance with some embodiments of the present disclosure.

FIG. 2 is a block diagram schematically illustrating selected components of an example system 200 comprising the computing device 100 of FIG. 1 communicating with server device(s) 201, where the combination of the device 100 and the server device(s) 201 (henceforth also referred to generally as server 201) are configured to verify conformance of digital content to accessibility guidelines, and correct possible violations of the accessibility guidelines, in accordance with some embodiments of the present disclosure.

In an example, the communication adaptor 140 of the device 100 can be implemented using any appropriate network chip or chipset allowing for wired or wireless connection to network 205 and/or other computing devices and/or resources. To this end, the device 100 is coupled to the network 205 via the adaptor 140 to allow for communications with other computing devices and resources, such as the server 201. The network 205 is any suitable network over which the computing devices communicate. For example, network 205 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In one embodiment, the server 201 comprises one or more enterprise class devices configured to provide a range of services invoked to provide accessibility verification and correction services, as variously described herein. In some embodiments, the server 201 comprises an accessibility verification and correction system 202 providing such services, as variously described herein. Although one server implementation of the accessibility verification and correction system is illustrated in FIG. 2, it will be appreciated that, in general, tens, hundreds, thousands, or more such servers can be used to manage an even larger number of accessibility verification and correction functions.

In the illustrated embodiment, the server 201 includes one or more software modules configured to implement certain of the functionalities disclosed herein, as well as hardware configured to enable such implementation. These hardware and software components may include, among other things, a processor 232, memory 234, an operating system 236, an accessibility verification and correction system 202 (also referred to as system 202), data storage module 246, and a communication adaptor 240. A digital content database 248 (e.g., that comprises a non-transitory computer memory) comprises digital content 120, codes 122, accessibility guidelines 124, corrected digital content 126, and/or corrected codes 128 (as discussed with respect to FIG. 1), and is coupled to the data storage module 246. A bus and/or interconnect 244 is also provided to allow for inter- and intra-device communications using, for example, communication adaptor 240 and/or network 205. Note that components like the operating system 236 and accessibility verification and correction system 202 can be software modules that are stored in memory 234 and executable by the processor 232. The previous relevant discussion with respect to the symbolic nature of bus and/or interconnect 144 is equally applicable here to bus and/or interconnect 244, as will be appreciated.

Processor 232 is implemented using any suitable processor, and may include one or more coprocessors or controllers, such as an audio processor or a graphics processing unit, to assist in processing operations of the server 201. Likewise, memory 234 can be implemented using any suitable type of digital storage, such as one or more of a disk drive, a universal serial bus (USB) drive, flash memory, random access memory (RAM), or any suitable combination of the foregoing. Operating system 236 may comprise any suitable operating system, and the particular operation system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, store, receive, and transmit any type of data, including digital content and/or codes associated with such digital content. As shown, the server 201 includes the accessibility verification and correction system 202 that communicates with the system 102 on the client device 100. In an example, the accessibility verification and correction features discussed with respect to FIG. 1 can be implemented in FIG. 2 exclusively by the accessibility verification and correction system 102, exclusively by the accessibility verification and correction system 202, and/or may be shared between the accessibility verification and correction systems 102 and 202. Thus, in an example, none, some, or all accessibility verification and correction features are implemented by the accessibility verification and correction system 202.

For example, when located in the server 201, the accessibility verification and correction system 202 comprises an application running on the server 201 or a portion of a software application that can be downloaded to the device 100. For instance, the system 102 can include a web hosting application allowing the device 100 to interact with content from the accessibility verification and correction system 202 hosted on the server 201. In this manner, the server 201 verifies conformance of digital content to accessibility guidelines, and corrects possible violations of the accessibility guidelines. Thus, the location of some functional modules in the system 202 may vary from one embodiment to the next. For instance, while the image and content analysis module 112 is shown on the client side in this example case, it may be on the server side (e.g., within the system 202) in other embodiments. Any number of client-server configurations will be apparent in light of this disclosure. In still other embodiments, the techniques may be implemented entirely on a user computer, e.g., simply as stand-alone image modification application. Similarly, while the digital content database 148 is shown on the client side in this example case, it may be on the server side in other embodiments, such as a cloud-based image database. Thus, the database of the digital content and/or codes can be local or remote to the device 100, so long as it is accessible by the modules implemented by the system 102 or implemented by the system 202.

Example Operation

Figure 3A:
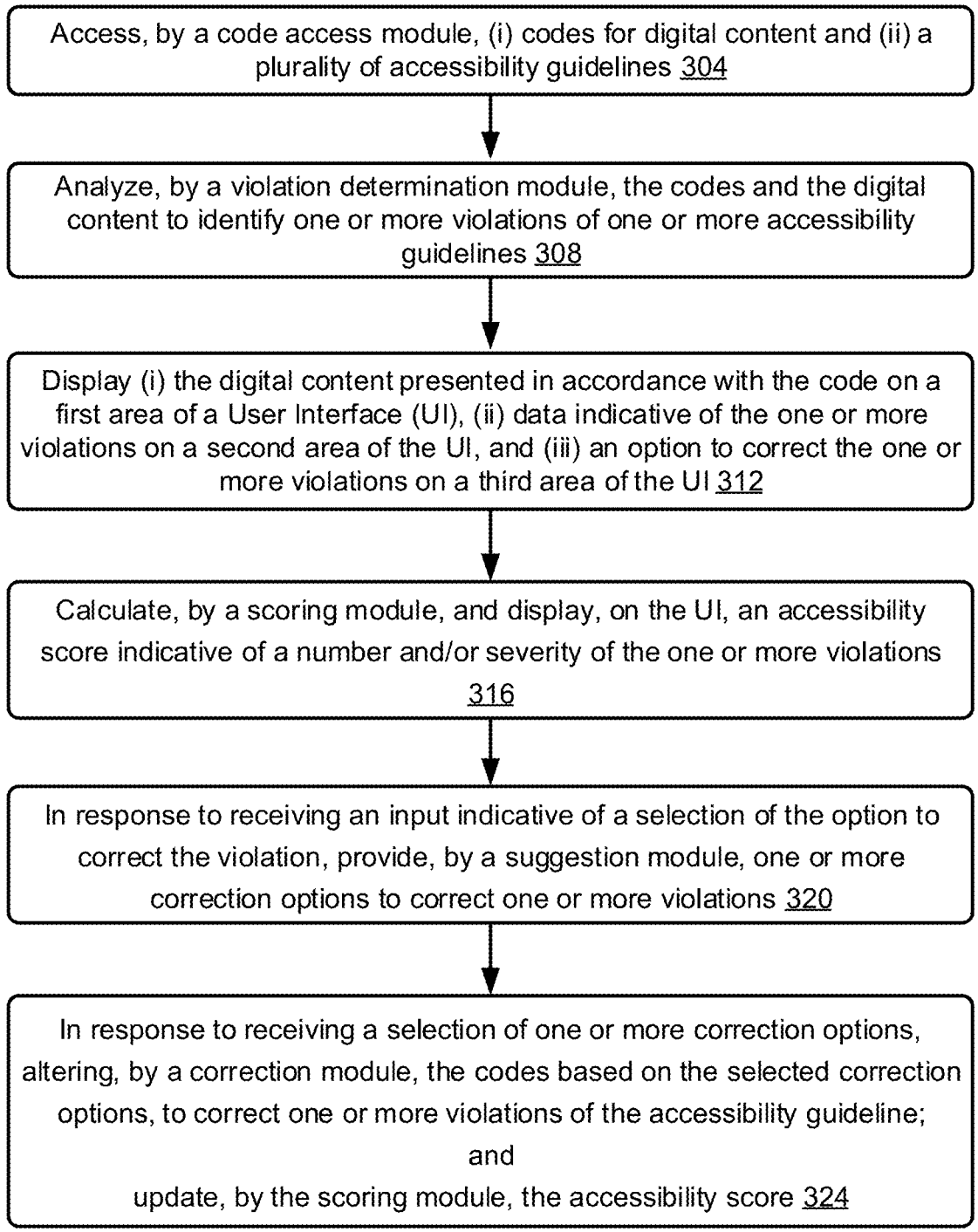
FIGS. 3A and 3B are flowcharts collectively illustrating an example methodology for verifying conformance of digital content to one or more accessibility guidelines, and correcting possible violations of the accessibility guidelines, in accordance with some embodiments of the present disclosure.

FIG. 3A is a flowchart illustrating an example method 300 for verifying conformance of digital content to one or more accessibility guidelines, and correcting possible violations of the accessibility guidelines, in accordance with some embodiments of the present disclosure. FIGS. 4A, 4B, 4C, 4D, 4D1, 4E, 4F, 4G, and 4H illustrate images depicting various operations discussed with respect to the example methodology of FIG. 3A, in accordance with some embodiments of the present disclosure. FIGS. 3A and 4A-4H will be discussed in unison.

Method 300 can be implemented, for example, using the system architecture illustrated in FIGS. 1 and/or 2, and described herein. However other system architectures can be used in other embodiments, as apparent in light of this disclosure. To this end, the correlation of the various functions shown in FIG. 3A to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. Although various operations of the method 300 are discussed herein as being performed by the accessibility verification and correction system 102 of the computing device 100, one or more of these operations can also be performed by the accessibility verification and correction system 202 of the server 201 as well.

Referring to FIG. 3A, the method 300 comprises, at 304, accessing (e.g., by a code access module 104 of the accessibility verification and correction system 102, illustrated in FIG. 1), (i) codes for digital content and (ii) a plurality of accessibility guidelines. For example, FIG. 4A illustrates a User Interface (UI) 400a through which the system 102 accesses the codes for digital content.

In some example embodiments, the codes can be of any appropriate type. In some examples, codes 422 illustrated in FIG. 4B comprise Hypertext Markup Language (HTML) codes. The HTML codes comprise standard HTML markup language for documents designed to be displayed in a web browser. Thus, in such examples, the codes 422 define one or more aspects of how digital content is to be presented, and how elements of the digital content (such as images, texts, forms, etc.) are embedded into the rendered webpage. HTML provides a means to create structured documents, by denoting structural semantics for text such as headings, paragraphs, lists, links, quotes and other items. HTML elements are delineated by tags, written using angle brackets. Tags such as <img/> and <input/> directly introduce content into the page. Other tags such as <p> surround and provide information about document text and may include other tags as sub-elements. Web browsers do not display the HTML tags, but use such tags to interpret the content of the web page, and render and display the web page with the underlying content. A screen reader (such as a text-to-speech synthesizer, which may be used by a blind or partially blind user browsing the web page) can read aloud the content of the webpage, and the HTML codes also define an order and a manner in which the screen reader is to read out the webpage. Thus, the codes 422, which are HTML codes in some examples, define one or more aspects of how the digital content is presented visually (e.g., in a web page) and/or is presented aurally (e.g., read aloud) by a screen reader.

In some other embodiments, the codes comprise another appropriate programming language, such as Cascading Style Sheets (CSS), scripting languages such as JavaScript, or other types of language. In yet some other embodiments, the codes are not analyzed, and instead, the digital content representative of the codes are analyzed.

Figure 4B:
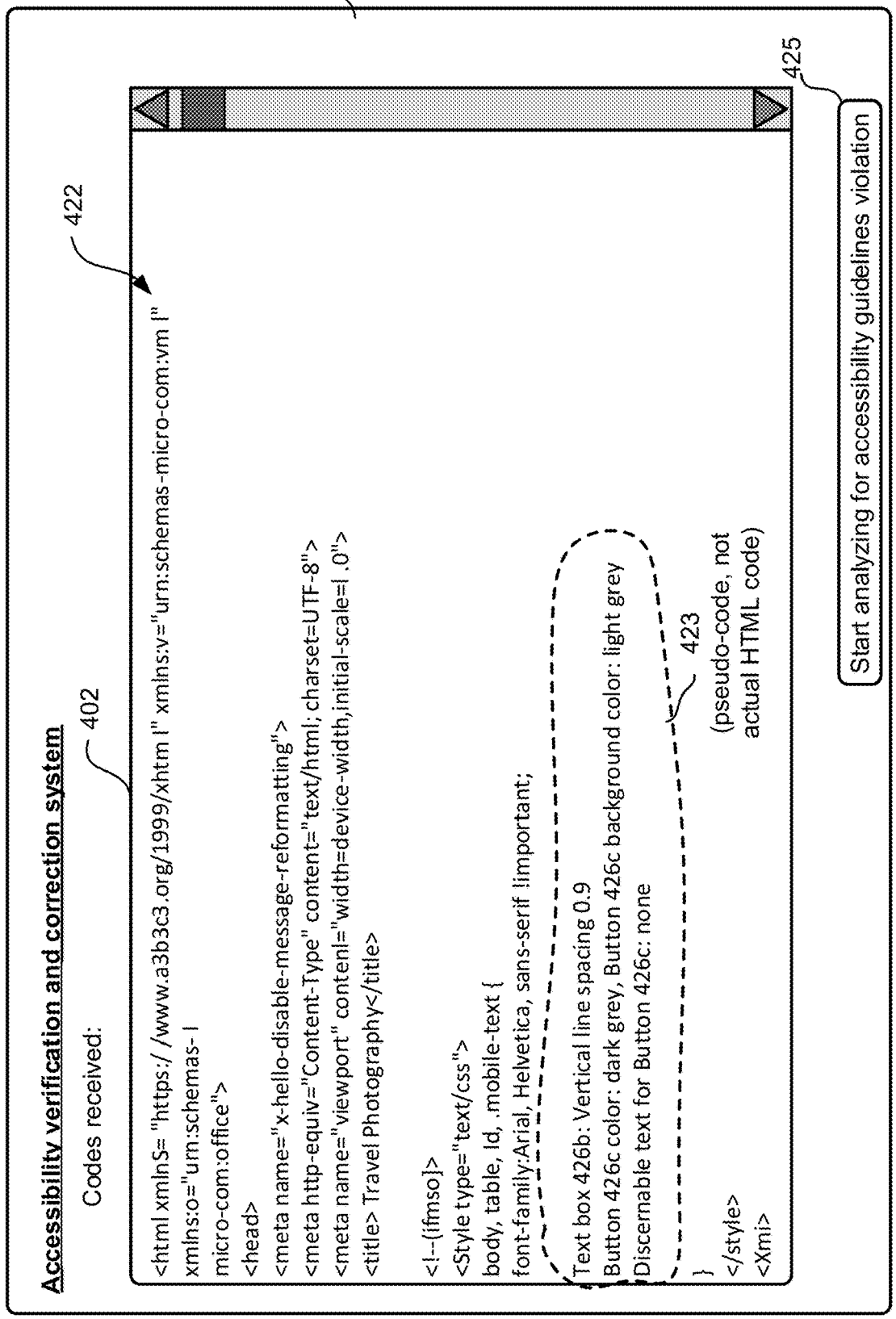

As discussed herein, the digital content 426 can be any appropriate type of digital content. Merely as an example, the digital content 426 includes marketing emails and/or marketing brochures that a marketer intends to send to its customer base. Prior to sending the marketing emails and/or marketing brochures, the marketer uses the system 102 to make sure that the marketing emails and/or marketing brochures adhere to accessibility guidelines, such that a disabled customer does not have difficulty in accessing the digital content. In some other examples, the digital content 426 includes other types of emails and/or brochures, content of a webpage, including a landing page of a website, digital presentations, a word processing document, a spreadsheet document, or a Portable Document Format (PDF) document, and/or any other appropriate type of digital content that a disabled person can possibly access. Digital content 426 (illustrated in FIG. 4C), rendered and presented in accordance with the codes 422 of FIG. 4B, is displayed within an area in the left side of a UI 400*c*.

Referring again to FIG. 4A, the system 102 causes display of the UI 400*a*, through which accessibility verification and correction operations are to be performed. The UI 400*a* can be launched within a web browser, or via an application installed on the computing device 100 (or the server 201). The UI is displayed on the display 142 of the computing device 100.

In some examples, the UI 400*a* provides an option 408 to upload the codes for the digital content from a file. The file can be stored locally within the computing device 100, such as in the local digital content database 148. In some other examples, the file can be stored remotely or in the cloud, such as in the remote digital content database 248. Selecting the option 408 (e.g., using a mouse pointer 409, by clicking or tapping the option 408) facilitates uploading of the code from the locally or remotely stored location.

In some examples, the UI 400*a* provides an option 412 to upload a Uniform Resource Locator (URL) for a website or a webpage. For example, if content of a webpage www.abc_example_xyz.com is to be analyzed for possible accessibility guideline violations, the developer (e.g., who is a developer of the digital content, the codes and/or is a user of the system 102) enters the URL or the web address of the webpage in the box 412. The system 102 (such as the code access module 104 of the accessibility verification and correction system 102, illustrated in FIG. 1) accesses the codes associated with the content of the URL www.abc_example_xyz.com.

In some examples, the UI 400*a* also provides an option 416 to import codes to be analyzed from an application. Merely as an example, the application can be ADOBE® EXPERIENCE MANAGER® (AEM) software application. "ADOBE" and "ADOBE EXPERIENCE MANAGER" are registered trademarks of Adobe Inc. in the United States and/or other countries. In some other examples, the codes can be imported from any appropriate application that is used to write or modify the codes.

In some examples, the UI 400*a* also provides an option 420 to paste the codes within a space provided in the UI 400*a*. For example, the developer can copy the codes from an appropriate file and paste the codes in the area provided within the UI 400*a*.

FIG. 4B illustrates the codes 422 received by the system 102. The codes 422 can be received by any of the options 408, 412, 416, or 420 of FIG. 4A. The received codes are displayed within a window 402 of a UI 400*b*. Thus, a developer can transition from the UI of FIG. 4A to the UI of FIG. 4B by uploading the codes 422.

In the example of FIG. 4B, the codes 422 comprise pseudo-codes 423, which include attributes of various elements within digital content that is to be presented based on the codes 422. As noted, the pseudo-codes 423 are not an actual HTML codes, but are pseudo-codes or dummy codes for purposes of better explaining the principles of this disclosure. The pseudo-codes 423 will be discussed in further detail herein in turn.

In some examples, the UI 400*b* of FIG. 4B includes an option 425 (e.g., in the form of a button) to start analyzing the codes 422 for accessibility guidelines violation. In response to the developer selecting the option 425, the UI 400*b* transitions to a UI 400*c* of FIG. 4C. For example, the digital content 426, rendered and presented in accordance with the codes 422 of FIG. 4B, is displayed within an area in the left side of the UI 400*c*. As seen, the digital content 426 includes an image 426*a*, a short description (e.g., text 426*b*) for a software application for photographs, and a button 426*c* that provides an option to download a photo application. The digital content 426 illustrated in FIG. 4C is merely an example, and the content of the digital content 426 do not in any way limit the teachings of this disclosure.

Figure 4C:
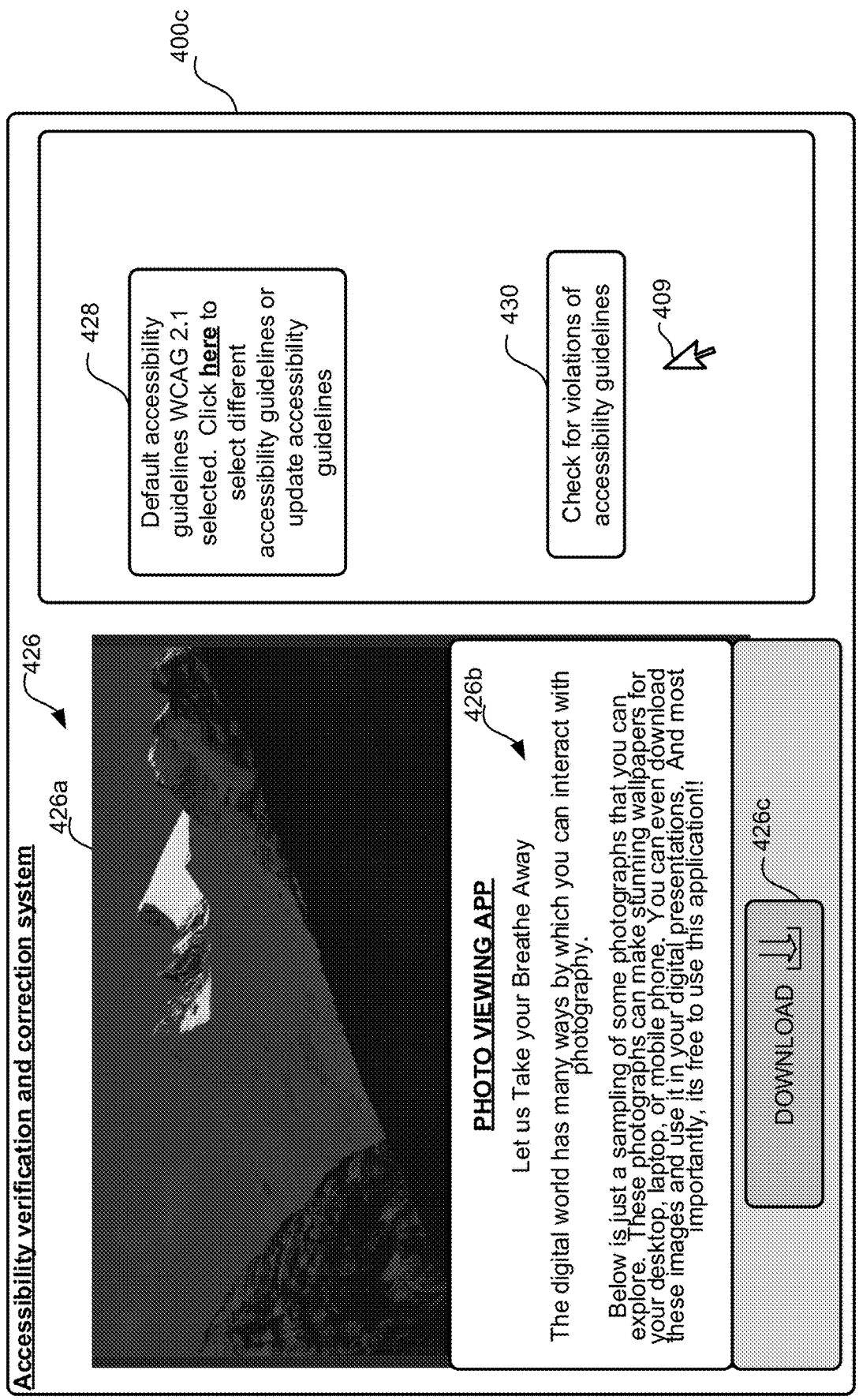

In some examples, the UI 400*c* of FIG. 4C also illustrates default accessibility guidelines to which the system 102 is to adhere. For example, as illustrated in FIG. 4C, a box 428 includes the following: "Default accessibility guidelines WCAG 2.1 selected. Click here to select different accessibility guidelines or update accessibility guidelines." As discussed herein, the Web Content Accessibility Guidelines or WCAG are part of a series of web accessibility guidelines published by the Web Accessibility Initiative (WAI) of the World Wide Web Consortium (W3C), the main international standards organization for the Internet. These guidelines are a set of recommendations for making Web content more accessible, primarily for people with disabilities, but also for various user agents, including highly limited devices, such as mobile phones and tablets. Version 2.1 of the WCAG guidelines, referred to herein as WCAG 2.1, was published on Jun. 5, 2018, and is used merely as an example herein.

Thus, the system 102 uses the WCAG 2.1 accessibility guidelines as default, although the developer can select any other appropriate accessibility guidelines by interacting with the option 428. For example, the developer can select another version (e.g., newer or older version than version 2.1) of the WCAG accessibility guidelines, or can select other appropriate accessibility guidelines.

Referring again to FIG. 3A, as previously discussed herein, the method 300 comprises, at 304, accessing (i) codes for digital content and (ii) a plurality of accessibility guidelines. For example, FIGS. 4A-4B illustrate accessing the codes 422 for the digital content 426, and FIG. 4C illustrates accessing the accessibility guidelines, e.g., which can be a default pre-selected accessibility guidelines or other accessibility guidelines selected by the developer.

The method 300 then proceeds from 304 to 308, where the system 102 (e.g., the violation determination module 106 of the system 102, illustrated in FIGS. 1 and 2) analyzes the codes 422 (and optionally the digital content 426 as well), to identify one or more violations of one or more accessibility guidelines. For example, the UI 400c of FIG. 4C also includes an option 430, such as a button 430, for checking violations of the selected or default accessibility guidelines. When the developer selects the option 430, the UI 400c transitions to UI 400d of FIG. 4D.

Figure 4D:
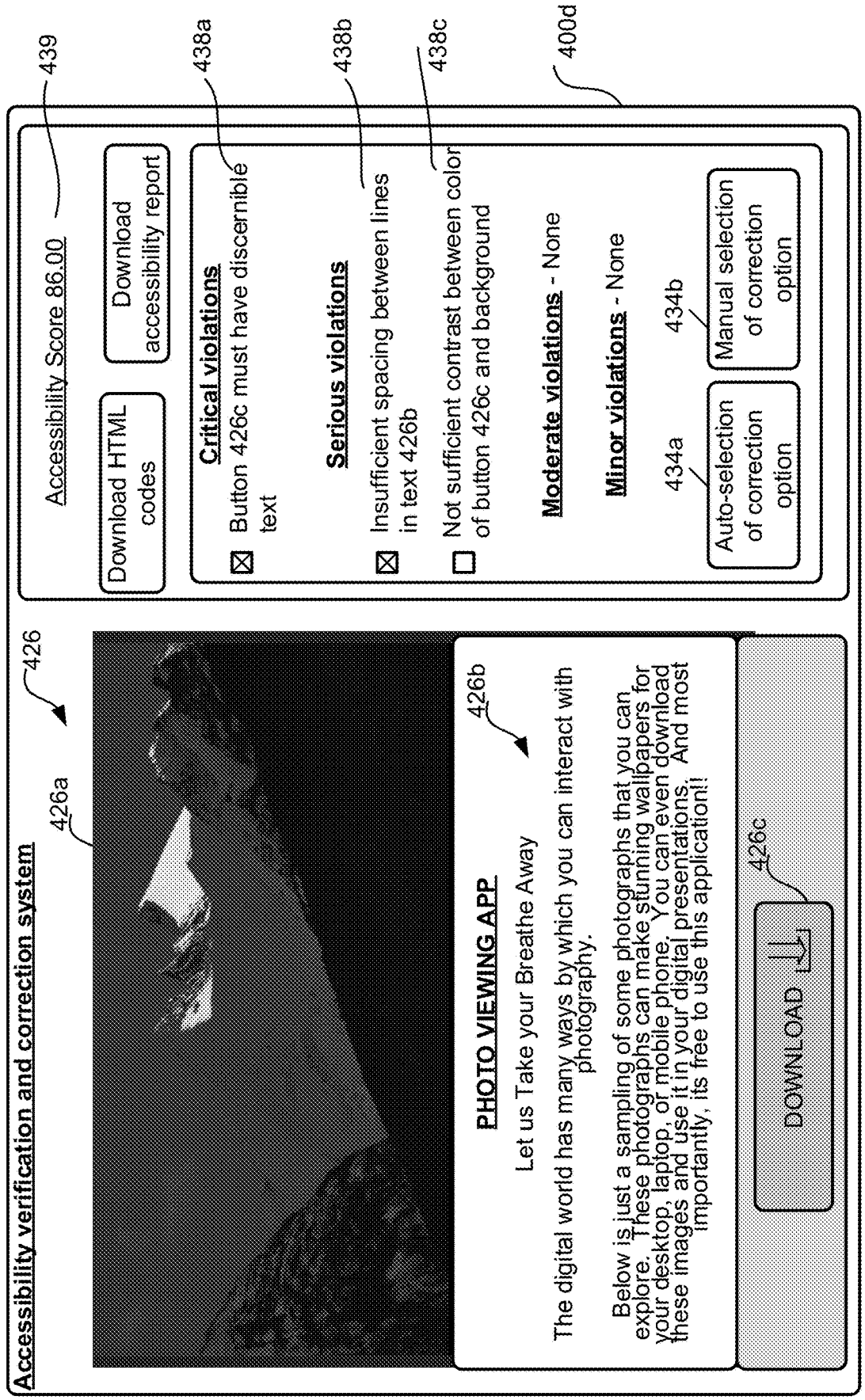

FIG. 4D illustrates the UI 400d, with example violations 438a, 438b, 438c of the accessibility guidelines illustrated in the right side of the UI. In some embodiments, the violations are categorized as critical violations, serious violations, moderate violations, and minor violations. As the names suggest, the critical violations are more severe than the serious violations, which are in turn more severe than the moderate violations, and so on. In the example of FIG. 4D, the violation 438a is a critical violation, the violations 438b and 438c are serious violations, and no moderate and minor violations are illustrated in the example of FIG. 4D. Each violation is associated with corresponding one or more attributes of the codes 422 that violate a corresponding accessibility guideline, as will be discussed in turn. Categorizing the violations into multiple categories provides the developer with an understanding of criticality or severity of the violations, so that the developer can choose to fix more severe ones and possibly ignore the less severe ones (or fix all the violations), if the developer chooses to do so.

The violations 438a, 438b, 438c illustrated in FIG. 4D are mere example violations, and the system 102 can detect one or more other types of violations discussed herein, or one or more other types of violations envisioned by those skilled in the art based on the teachings of this disclosure. Although merely three violations are illustrated, the number of violations can be zero or any positive integer (such as 0, 1, 2, or higher), based on how well the codes 422 are coded to follow the accessibility guidelines. The actual words and phrases used to describe the violations 438a, 438b, 438c in FIG. 4D are mere examples, and not intended to limit the scope of this disclosure.

The violation 438a is, for example, a critical violation regarding absence of discernable text associated with the button 426c. For example, the pseudo codes 423 of FIG. 4B indicate the following: "Discernable text for Button 426c: none." Thus, here the example attribute "Discernable text for Button 426c" has a value of "none" or null value, which violates a corresponding one of the accessibility guidelines. The violation determination module 106 of the system 102 checks the codes 422, to identify that the button 426c does not have any associated discernable text. Typically, when a non-disabled user views the button 426c, the user identifies the function of the button 426c based on a logo, words, and/or graphics associated with or included within the button. For example, a non-disabled user can readily understand that the button 426c is for downloading the photo viewing application program (e.g., based on the word "DOWNLOAD" or an icon for downloading content, which are on the button 426c). However, screen reader users, such as blind or partially blind users who rely on text-to-speech synthesis tools, may not be able to discern the graphical representation of the word "DOWNLOAD" or the graphics representation of the download icon within the button 426c. In such cases, screen reader users usually rely on text-to-speech synthesis tools, which provides voice output of discernable text, if any, associated with the button 426c. However, as the button 426c lacks discernable text, the text-to-speech synthesis tool cannot aurally provide any description for the button 426c. This is a violation of a corresponding accessibility guideline.

Referring again to FIG. 4D, the violation 438b, for example, is a serious violation regarding insufficient spacing between lines in the text 426b. For example, the pseudo code 423 of FIG. 4B indicates the following: "Text box 426b: Vertical line spacing 0.9." Accordingly, the violation determination module 106 of the system 102 checks the codes 422, to identify that the line spacing in the text within the box 426b is less than a minimum threshold line spacing specified by the accessibility guidelines. A partially blind or a dyslexic user may find it difficult to read the text within the box 426b, due to the insufficient line spacing. In this example, the example attribute associated with line spacing is set at 0.9, which violates a corresponding minimum line spacing guideline of the accessibility guidelines.

Referring again to FIG. 4D, the violation 438c is, for example, a serious violation regarding insufficient contrast between colors of the button 426c and the background. For example, the background on which the button 426c is located is light grey, whereas the button 426c is dark grey, thereby creating insufficient color contrast between the two. A partially blind user or a color-blind user may find it difficult to readily identify and distinguish the button 426c from its background. For example, the pseudo code 423 of FIG. 4B indicates the following: "Button 426c color: dark grey, Button 426c background color: light grey." The violation determination module 106 of the system 102, for example, checks the codes 422, to identify that color contrast of two overlapping elements are insufficient, thereby identifying the violation 438c. In this example, the example attributes associated with colors are set at grey and light grey, which do not have sufficient different in contrast, as a result of which the attributes violate a corresponding color guideline of the accessibility guidelines.

In some embodiments, the developer can choose to download an accessibility report (e.g., by selecting the appropriate option displayed on top right corner of the UI 400d), which lists the violations identified by the system 102. FIG. 4D1 is an accessibility report 427 listing the violations discussed with respect to FIG. 4D. The accessibility report 427 is self-explanatory, in view of the discussion with respect to FIG. 4D. The words or phrases in the "description" column of FIG. 4D1 are mere examples, and different words or phrases can be used to describe the corresponding violation.

As discussed, the three violations of three corresponding accessibility guidelines, as presented in FIG. 4D, are mere examples, and the violation determination module 106 of the system 102 can check for possible violations of many other accessibility guidelines. Table 1 below includes various example accessibility guidelines that are checked for possible violations by the violation determination module 106.

TABLE 1

| Sr. No. | Issue Severity | Issue Description |
|---|---|---|
| 1 | Critical | <area> elements of image maps must have alternate text |
| 2 | Critical | <audio> elements must have captions |
| 3 | Critical | <img> elements must have alternate text or a role of none or presentation |
| 4 | Critical | <input type = "image"> elements must have alternate text |
| 5 | Critical | <meta http-equiv = "refresh"> must not be used |
| 6 | Critical | <meta name = "viewport"> must not disable text scaling and zooming |
| 7 | Critical | <video> elements must have captions |
| 8 | Critical | All ARIA attributes must have valid values |
| 9 | Critical | ARIA attributes must be allowed for an element's role |
| 10 | Critical | aria-hidden = 'true' must not present on the document body. |
| 11 | Critical | Attributes that begin with aria- must be valid ARIA attributes |
| 12 | Critical | Buttons must have discernible text |
| 13 | Critical | Each non-empty data cell in a large table must have one or more table headers |
| 14 | Critical | Elements with an ARIA role that require child roles must contain them |
| 15 | Critical | Elements with an ARIA role that require parent roles must be contained by them |
| 16 | Critical | Elements with ARIA roles must have all required ARIA attributes |
| 17 | Critical | Every id attribute value used in ARIA and in labels must be unique |
| 18 | Critical | Input buttons must have discernible text |
| 19 | Critical | Every form element must has a label |
| 20 | Critical | Scope attribute must be used correctly on tables |
| 21 | Critical | Elements with a role attribute must use a valid value |
| 22 | Minor | <meta name = "viewport"> must scale a significant amount |
| 23 | Minor | Elements in the focus order must have an appropriate role |
| 24 | Minor | Every id attribute value must be unique |
| 25 | Minor | Headings must have discernible text |
| 26 | Minor | Image alternative must not be repeated as text |
| 27 | Minor | Links with the same accessible name must serve a similar purpose |
| 28 | Minor | Role attribute must have an appropriate value for the element |
| 29 | Minor | Server-side image maps must not be used |
| 30 | Minor | Tables must not have the same summary and caption |
| 31 | Minor | Users must be informed about hidden content. |
| 32 | Moderate | <video> or <audio> elements must not autoplay audio for more than 3 seconds without a control mechanism to stop or mute the audio |
| 33 | Moderate | All page content must be contained by landmarks |
| 34 | Moderate | All skip links must have a focusable target |
| 35 | Moderate | Banner landmark must be at top level |
| 36 | Moderate | Complementary landmark or aside must be at top level |
| 37 | Moderate | Contentinfo landmark must be at top level |
| 38 | Moderate | Document must have a main landmark |
| 39 | Moderate | Document must have at most one banner landmark |
| 40 | Moderate | Document must have at most one contentinfo landmark |
| 41 | Moderate | Document must have at most one main landmark |
| 42 | Moderate | Elements that have scrollable content should be accessible by keyboard |
| 43 | Moderate | Every form field must not have multiple label elements |
| 44 | Moderate | HTML elements with both valid lang and xml:lang attributes must agree on the base language of the page |
| 45 | Moderate | Landmarks must have a unique role or role/label/title (i.e. accessible name) combination |
| 46 | Moderate | Main landmark must be at top level |
| 47 | Moderate | Order of headings must be semantically correct |
| 48 | Moderate | The page, or at least one of its frames must contain a level-one heading |
| 49 | Serious | Every ARIA input field must have an accessible name |
| 50 | Serious | Every ARIA toggle field must have an accessible name |
| 51 | Serious | [role = 'img'] elements must have alternate text |
| 52 | Serious | <blink> elements must not be used |
| 53 | Serious | <dl> elements must be structured correctly |
| 54 | Serious | <dt> and <dd> elements must be contained by a <dl> |
| 55 | Serious | <iframe> and <frame> elements must contain a non-empty title attribute |
| 56 | Serious | <iframe> and <frame> elements must contain a unique title attribute |
| 57 | Serious | <li> elements must be used semantically |
| 58 | Serious | <marquee> elements must not be used |
| 59 | Serious | <object> elements must have alternate text |
| 60 | Serious | aria-hidden elements must not contain focusable elements |
| 61 | Serious | aria-role description must only be used on elements with an implicit or explicit role |
| 62 | Serious | Autocomplete attribute must be correct and suitable for the form field |
| 63 | Serious | Content must not locked to any specific display orientation, and the content must be operable in all display orientations |
| 64 | Serious | Contrast between foreground and background colors must meet WCAG 2 AA contrast ratio thresholds |
| 65 | Serious | Each cell in a table using the headers must refer to another cell in that table |
| 66 | Serious | Each HTML document must contain a non-empty <title> element |
| 67 | Serious | Each page must have at least one mechanism for a user to bypass navigation and jump straight to the content |

TABLE 1-continued

| Sr. No. | Issue Severity | Issue Description |
|---|---|---|
| 68 | Serious | Each table header in a data table must refer to data cells |
| 69 | Serious | Elements labelled through their content must have their visible text as part of their accessible name |
| 70 | Serious | Every accesskey attribute value must be unique |
| 71 | Serious | Every form element is must not be solely labeled using the title or aria-describedby attributes |
| 72 | Serious | Every HTML document must have a lang attribute |
| 73 | Serious | Every id attribute value of active elements must be unique |
| 74 | Serious | Lang attribute of the <html> element must have a valid value |
| 75 | Serious | Lang attributes must have valid values |
| 76 | Serious | Links must be distinguished without relying on color |
| 77 | Serious | Links must have discernible text |
| 78 | Serious | Lists must be structured correctly |
| 79 | Serious | p elements must not be used to style headings |
| 80 | Serious | svg elements with an img, graphics-document or graphics-symbol role must have an accessible text |
| 81 | Serious | tabindex attribute values must not be greater than 0 |
| 82 | Serious | Tables with a caption must use the <caption> element. |
| 83 | Serious | Text spacing set through style attributes must be adjusted with custom stylesheets |

In some embodiments, the violation determination module 106 of the system 102 checks for possible violations of one or more (or each) of the accessibility guidelines of Table 1. For example, referring to the Table 1 and FIG. 4D, the violation 438a is a violation of accessibility guideline number 12 of Table 1, the violation 438b is a violation of accessibility guideline number 64 of Table 1, and the violation 438c is a violation of accessibility guideline number 83 of Table 1. Some of the guidelines of Table 1 are at least in part included within, or in accordance with the WCAG 2.1 accessibility guidelines.

Referring again to FIG. 3A, the method 300 then proceeds from 308 to 312, where the system 102 displays (e.g., simultaneously displays) (i) the digital content presented in accordance with the codes on a first area of a UI, (ii) data indicative of the one or more violations on a second area of the UI, and (iii) an option to correct the one or more violations on a third area of the UI. For example, referring to the UI 400d of FIG. 4D, the digital content 426 presented in accordance with the codes 422 are displayed on a first area (e.g., left side) of the UI 400d. As also discussed herein, the UI 400d also displays data indicative of one or more violations on a second area (e.g., right side) of the UI, such as violations 438a, 438b, 438c of FIG. 4D.

In some examples, the UI 400d also illustrates one or more options to correct the violations. For example, a first option, in the form of a button 434a, is for auto-selection of correction options to correct the violations using alternative attributes recommended by the system 102. A second option, in the form of a button 434b, is for manual selection of correction options to correct the violations using alternative attributes provided or selected by the developer of the codes 422.

In the example UI 400d of FIG. 4D, each violation has a corresponding checkbox. The developer can check or uncheck individual checkboxes. In some instances, depending on whether a developer desires to correct (or not correct) a violation, the developer can check or uncheck the corresponding checkbox. For example, in the example of FIG. 4D, the checkboxes corresponding to violations 438a and 438b are checked or selected, whereas the checkbox corresponding to violation 438c is unchecked or unselected. This indicates that the developer desires to undertake corrective actions for the violations 438a and 438b, and the developer does not currently want to undertake such corrective actions for the violation 438c.

Referring again to FIG. 3A, the method 300 then proceeds from 312 to 316, where the system 102 (e.g., the scoring determination module 108 of the system 102, illustrated in FIGS. 1 and 2) calculates and causes display of an accessibility score indicative of a number and/or severity of the one or more violations identified by the system 102. For example, FIG. 4D illustrates the UI 400d displaying an accessibility score 439, which has an example value of 86.00 in FIG. 4D.

As discussed, the accessibility score 439 is based on a number and/or severity of the one or more violations. Thus, the developer can determine how accessible the digital content 426 is to the end customers, based on the accessibility score 439.

For example, as illustrated in Table 1, violations are categorized into example categories, such as critical, serious, moderate, and/or minor, to make the developer of the digital content 426 understand how important it is to fix individual violations, depending on its severity. In some examples, the accessibility score can have a maximum value of 100. The violations are weighted differently, depending on the above discussed severity of the violations. For example, the critical violation 438a of FIG. 4E has more impact on the score than the serious violation 438b.

The following equation depicts an example weighting parameter "A" for critical violations:

$$A = \text{(Number of Critical violations)}/\text{(Number of Critical violations+Number of Critical passes)} \quad \text{equation 1.}$$

For example, in the Table 1, there are about 21 accessibility guidelines that are deemed to be critically important. If there is a single critical violation (as is the case in the example UI 400d), then there are 20 critical passes (i.e., 20 critical accessibility guidelines have been deemed to not have been violated). Thus, for the example UI 400d, the value of the parameter A is 1/(1+20), or 1/21.

Similarly, weighting parameters B, C, and D for serious, moderate, and minor violations, respectively, are calculated as follows:

$$B = \text{(Number of serious violations)}/\text{(Number of serious violations+Number of serious passes)} \quad \text{equation 2.}$$

$C$=(Number of moderate violations)/(Number of moderate violations+Number of moderate passes)      equation 3.

$D$=(Number of minor violations)/(Number of minor violations+Number of minor passes)      equation 3.

Equations 2, 3, and 4 are self-explanatory, in view of the discussion with respect to equation 1.

In an example, the accessibility score 439 can be calculated as follows:

Accessibility score=1−(($A$*70)/100+($B$*15)/100+ ($C$*10)/100+($D$*5)/100)      Equation 5

Thus, in some examples and as seen in equation 5, the parameters A, B, C, and D are used to weight different levels or severity of violations differently, while calculating the final accessibility score 439. Merely as an example and without limiting the scope of this disclosure, in the example of equation 5, the parameters A, B, C, and D are respectively given a weightage of 70%, 15%, 10%, and 5%. In some examples, if there are no violations of critical accessibility guidelines, then a default score, such as a default score of 70, may be used.

Referring again to FIG. 3A, the method 300 then proceeds from 316 to 320, where in response to receiving an input indicative of a selection of the option to correct the violation, the system 102 (e.g., the suggestion module 110 of the system 102, illustrated in FIGS. 1 and 2), provides one or more correction options to correct one or more violations. For example, referring to the UI 400e of FIG. 4E, assuming that the manual selection option 434b is selected, a first window 440a within the UI 400e is displayed to correct the violation 438a, and a second window 440b within the UI 400e is displayed to correct the violation 438b.

In some examples, the windows 440a and 440b are displayed simultaneously. In some other examples, the window 440a is initially displayed and the violation 438a is corrected, and then the window 440b is displayed and the violation 438b is corrected. The arrows between a checkbook and a corresponding window, as illustrated in FIG. 4E, are merely for illustrative clarity (e.g., to correlate which window is used to correct which violation), and may or may not be displayed based on the manner in which the system 102 is implemented.

In some other examples, instead of or in addition to displaying the windows 440a, 440b, the options to correct the violations are displayed in another appropriate format. For example, clicking or selecting a violation can display, in a pop-up fashion, various options to correct the violations. The position, shape, and/or actual text within the windows 440a, 440b are merely examples, and do not limit the scope of this disclosure.

Figure 4E:
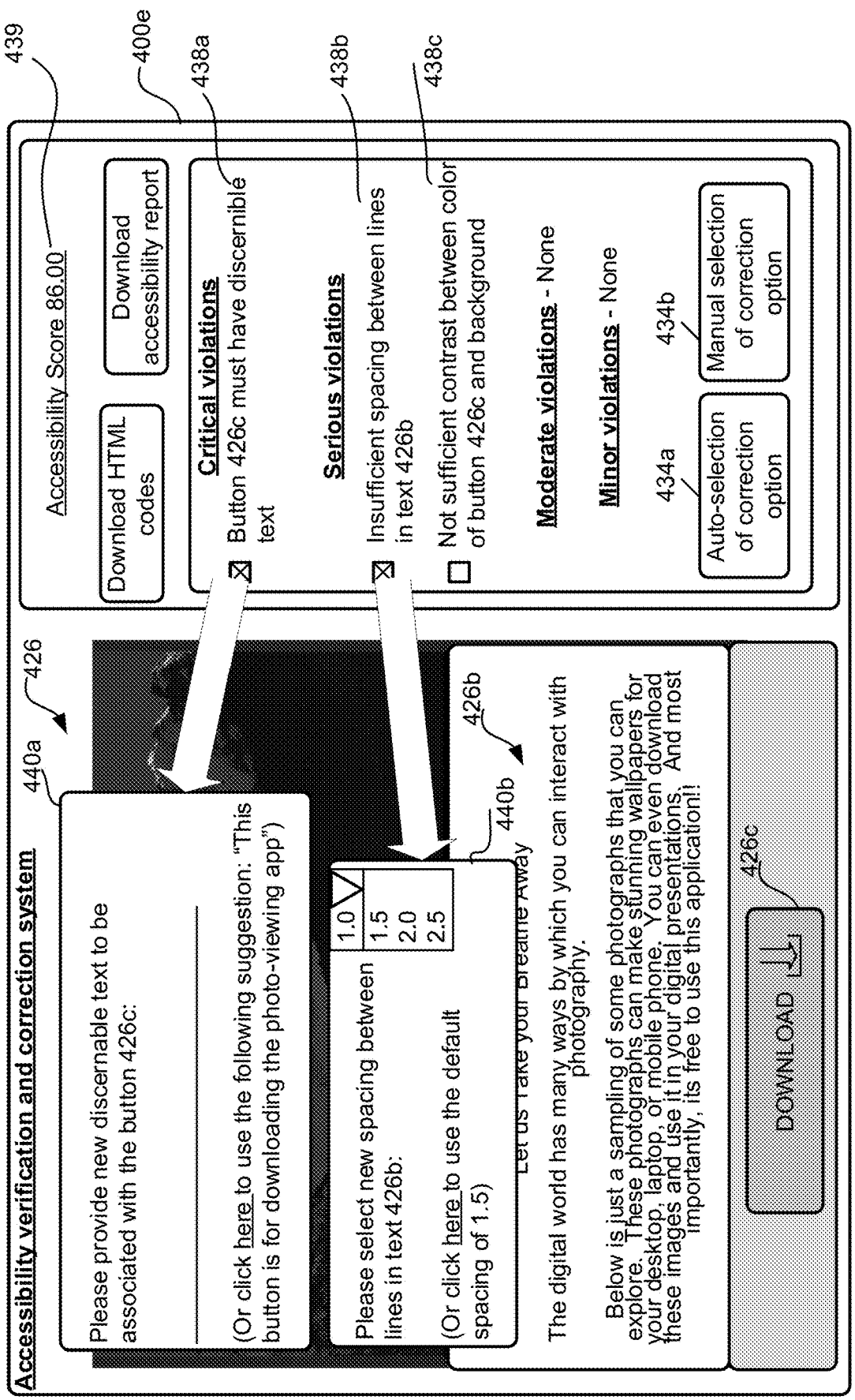

Referring to the window 440a in the UI 440e of FIG. 4E, as discussed, this window 440a provides correction options to correct the violation 438a, which is a critical violation regarding absence of discernable text associated with the button 426c. The window 440a provides an option to the developer of the codes 422 to enter new discernable text that is to be associated with the button 426c.

The window 440a also provides another option to the developer of the codes 422 to use a system generated (or system recommended) discernable text, which is, merely as an example, "This button is for downloading the photo-viewing app." For example, the image and content analysis module 112 of the system 102 (illustrated in FIGS. 1 and 2) analyzes the digital content 426 and/or the codes 422, to determine that the button 426c is for downloading the photo-viewing application discussed within the text block 426b. Accordingly, the suggestion module 110 recommends the discernable text within the window 440a. The developer of the code 422 can either select the system recommended discernable text associated with the button 426c, or can enter new discernable text via the window 440a.

Referring to the window 440b in the UI 440e of FIG. 4E, as discussed, this window 440b provides correction options to correct the violation 438b, which is regarding insufficient spacing in the text 426b. The window 440b provides an option to select new spacing in accordance with the corresponding accessibility guideline. For example, if the accessibility guideline recommends a minimum line spacing of 1.0, then the options provided has a minimum spacing value of 1.0. The developer can select an appropriate spacing, for example, using a drop-down menu, which has the minimum value of 1.0. The suggestion module 110 can also provide a default spacing option of 1.5 spacing as well, as illustrated in FIG. 4E.

In some embodiments, if the auto-selection option 434a of the UI 400d is selected by the developer, the system 102 automatically selects the default correction options (e.g., without waiting for the developer to select the default option). For example, if the auto-selection option 434a of the UI 400d is selected by the developer, the system 102 automatically selects the system-recommended discernable text of "This button is for downloading the photo-viewing app" for the violation 438a. Similarly, the system 102 selects the system-recommended spacing of 1.5 for the violation 438b, if the auto-selection option 434a is selected.

Of course, even if the developer decides to use the manual-selection option 434b, the developer can still select the system-recommended text and/or the system-recommend spacing from the corresponding correction windows 440a and/or 440b, respectively.

Referring again to FIG. 3A, the method 300 then proceeds from 320 to 324, where in response to receiving an input indicative of a selection of the one or more correction options, the system 102 (e.g., the correction module 114 of the system 102, illustrated in FIGS. 1 and 2) alters the codes 422 based on the selected correction options, to correct one or more violations of the accessibility guideline. For example, assume that the developer selected the system recommended correction option, e.g., the discernable text "This button is for downloading the photo-viewing app" from the correction window 440a, and selected a spacing of 1.25 from the correction window 440b. Based on such selections of the correction options, the correction module 114 of the system 102 alters the codes 422, to correct the one or more violations of the accessibility guideline.

Figure 4F:
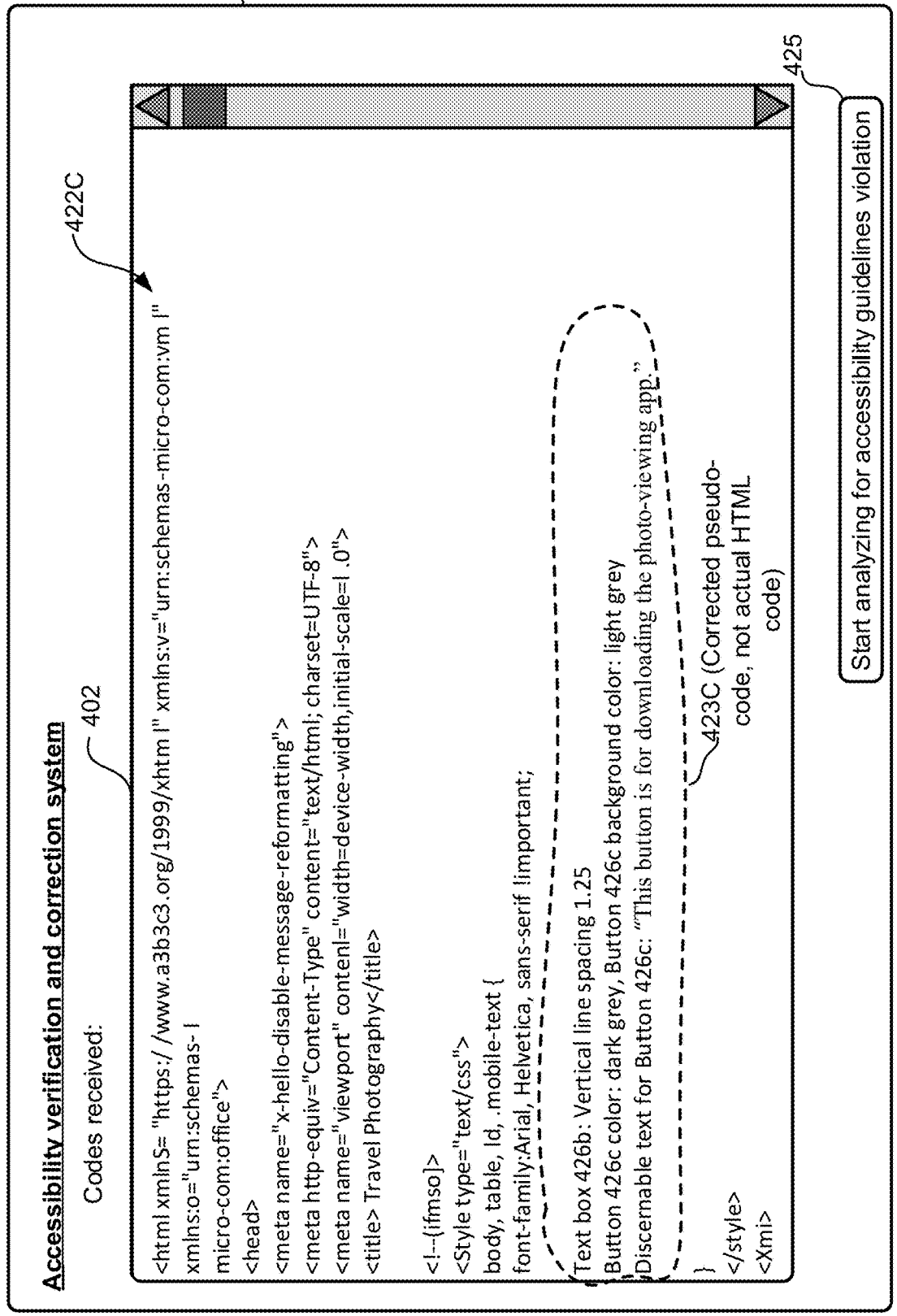

For example, FIG. 4F illustrates the altered codes 422C, where the corrected pseudo-code 423C now indicates the vertical line spacing for the text box 426b to be 1.25. Similarly, the corrected pseudo-code 423C now indicates the discernable text for Button 426c to be: "This button is for downloading the photo-viewing app." Thus, such alterations cause the violations 438a and 438b to be corrected. Note that in the example of FIG. 4E, the violation 438c was not corrected—hence, the pseudo-code corresponding to the violation ("Button 426c color: dark grey, Button 426c background color: light grey") remains unchanged.

Figure 4G:
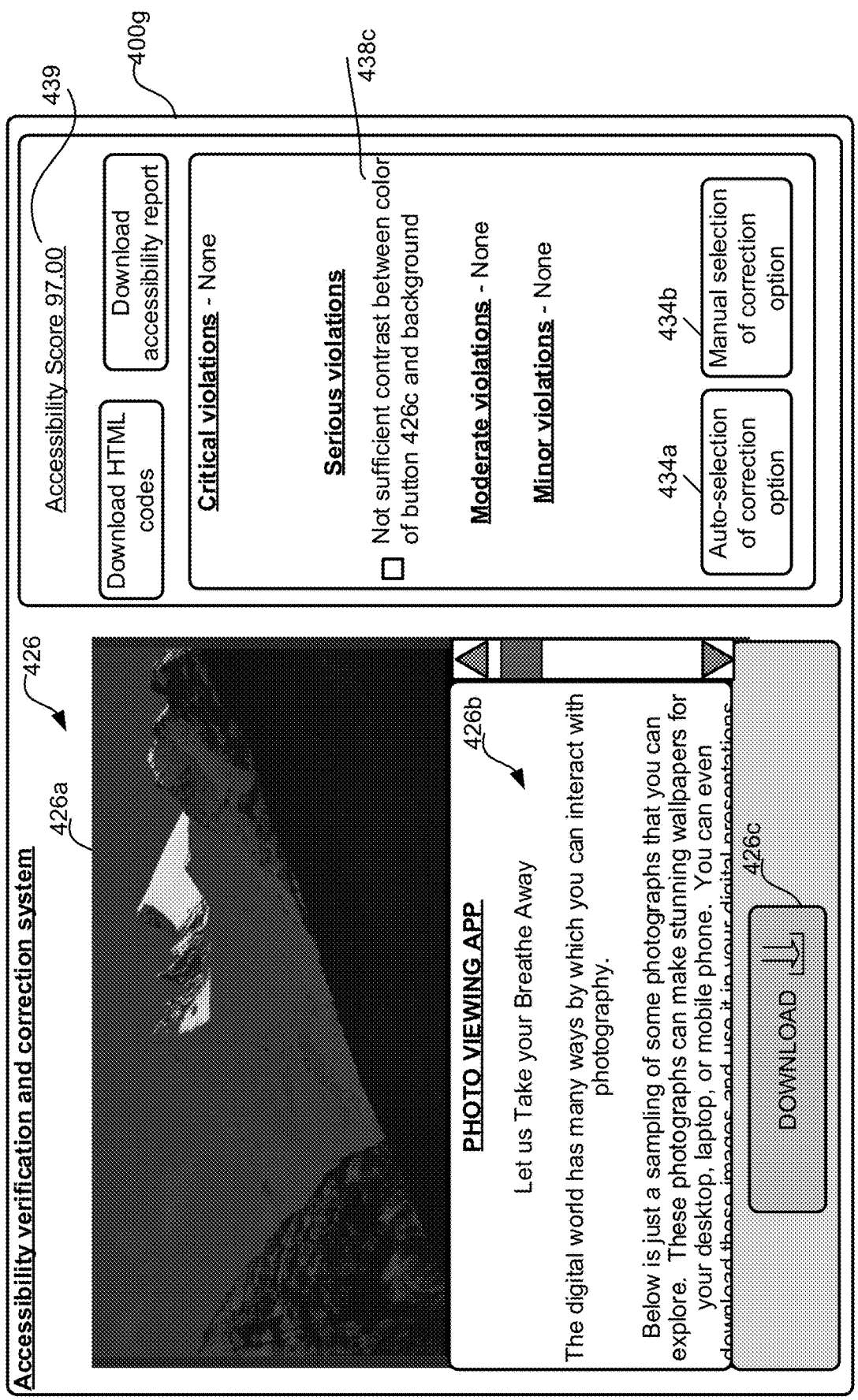

As illustrated in the UI 400g of FIG. 4G, the alterations of the codes 422 change one or more aspects of how the digital content 436 is to be presented. For example, now the text within the text box 426b is displayed with an increased spacing of 1.25. For example, now the text within the text box 426b in the UI 400g of FIG. 4G after the correction of the violation 438b is better legible compared to the display of text within the text box 426b in the UI 400d of FIG. 4D before the correction of the violation 438b.

Similarly, when a screen reader user, such as a blind or partially blind user, uses a text-to-speech synthesis tool to read the digital content 426, the button 426c would now be aurally read by the text-to-speech synthesis tool as "This button is for downloading the photo-viewing app," based on the corrected pseudo-codes 423C of FIG. 4F. In contrast, prior to the correction of the violation 438a, the text-to-speech synthesis tool could not have aurally described the button 426c, as there was no discernable text associated with this button.

Referring again to FIG. 3A, the method 300 further includes, at 324, updating, by the scoring module 108, the accessibility score, to show how the alteration of the codes 422 positively impacts the accessibility score. For example, referring to FIG. 4G, because the violations 438a and 438b are now corrected, the accessibility score 439 increases from 86.0 to 97.0 (note that the values of the accessibility score 439 are mere examples, and do not limit the scope of this disclosure). The accessibility score 439 is not perfect, as the violation 438c is still not cured.

Figure 4H:
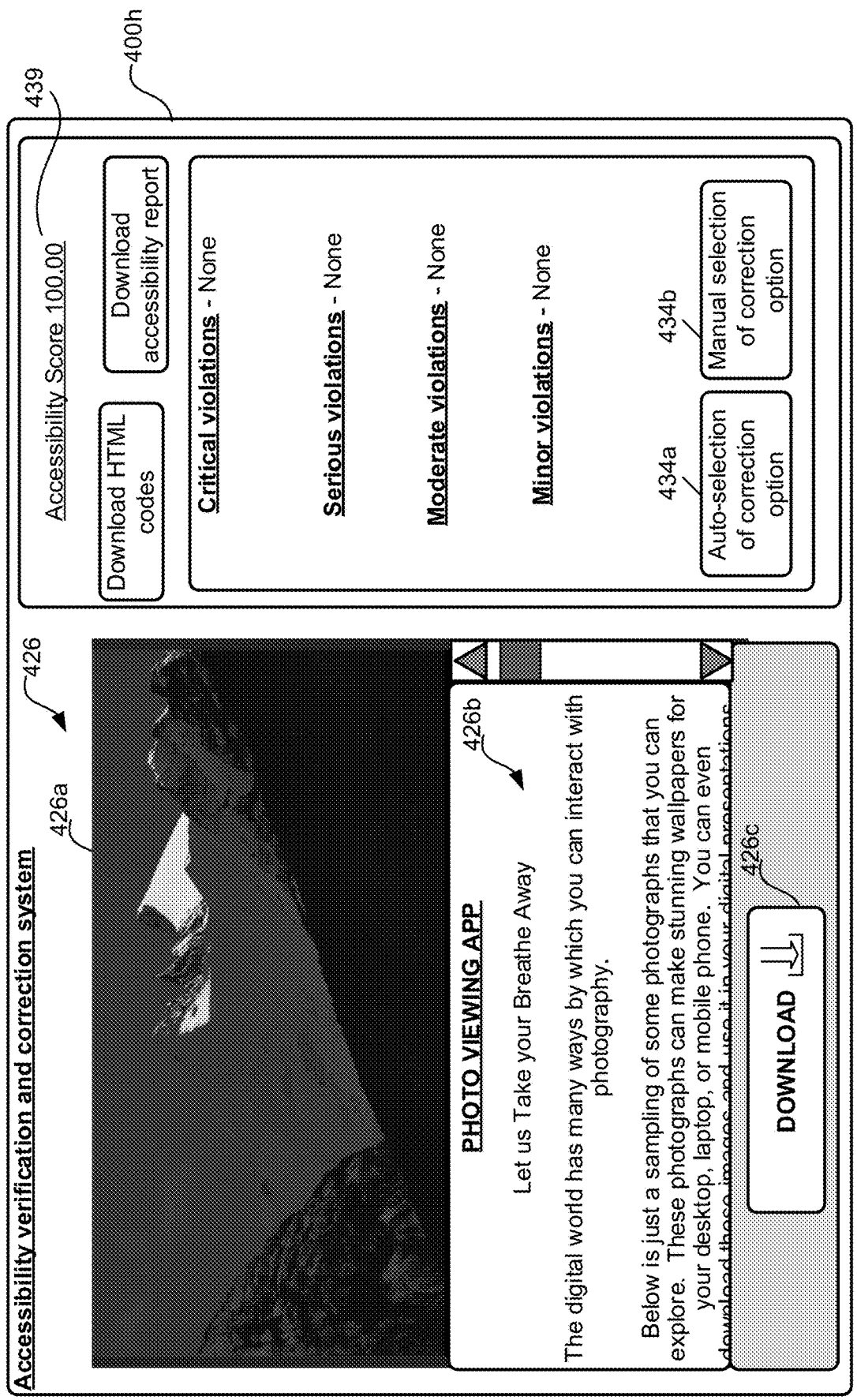

In an example, the developer can correct the violation 438c as well. For example, upon either auto-selection or manual-selection of the correction option for the violation 438c (e.g., as discussed with respect to FIGS. 4E-4G) and corresponding alteration of the codes 422, the UI 400g of FIG. 4G transitions to the UI 400h of FIG. 4H. As illustrated in FIG. 4H, the button 426c is now in white and the corresponding background is still light grey—this creates sufficient color contrast between the white button 426c and the light grey background. Accordingly, the violation 438c is no longer displayed, and the accessibility score is improved to be 100.0 in FIG. 4H.

Figure 3B:
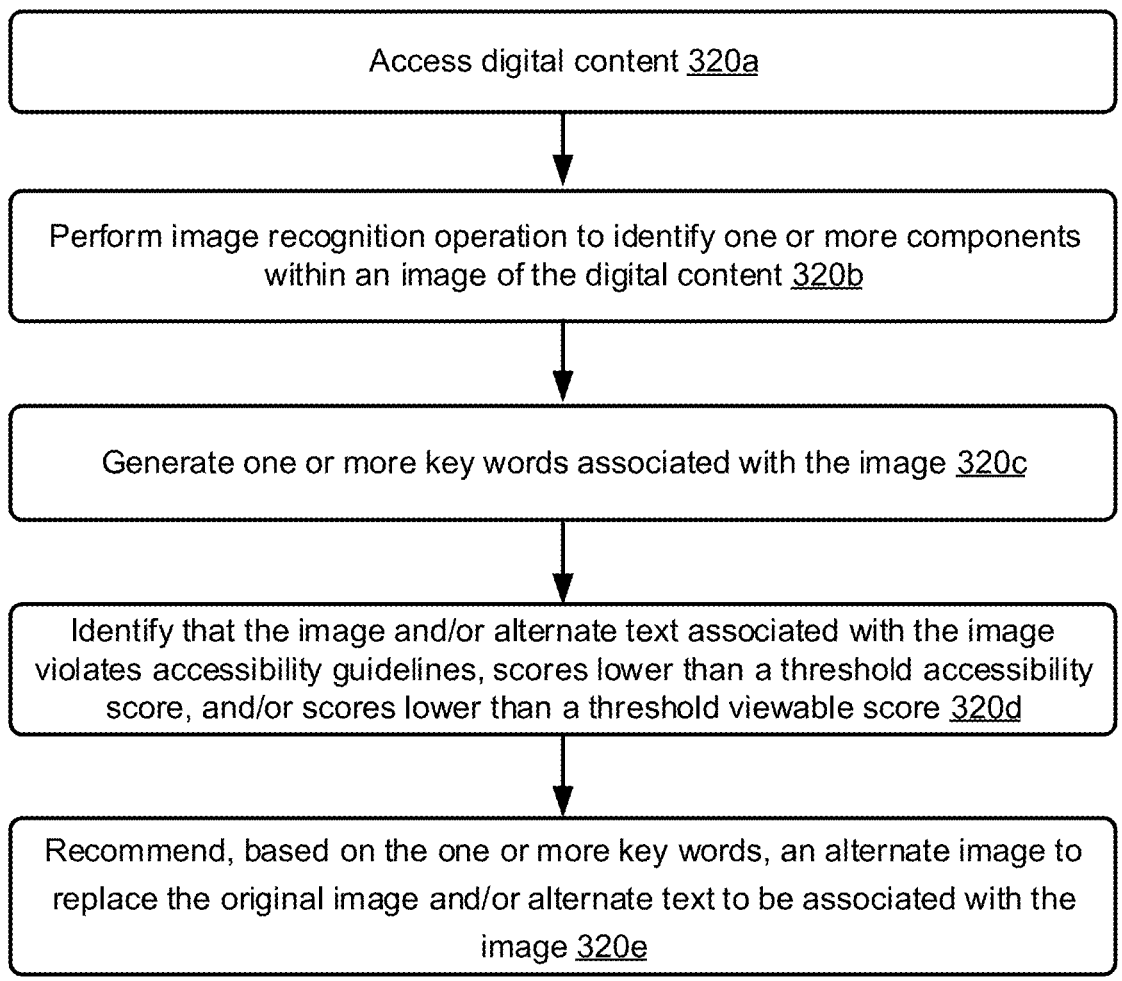
Figure 5:
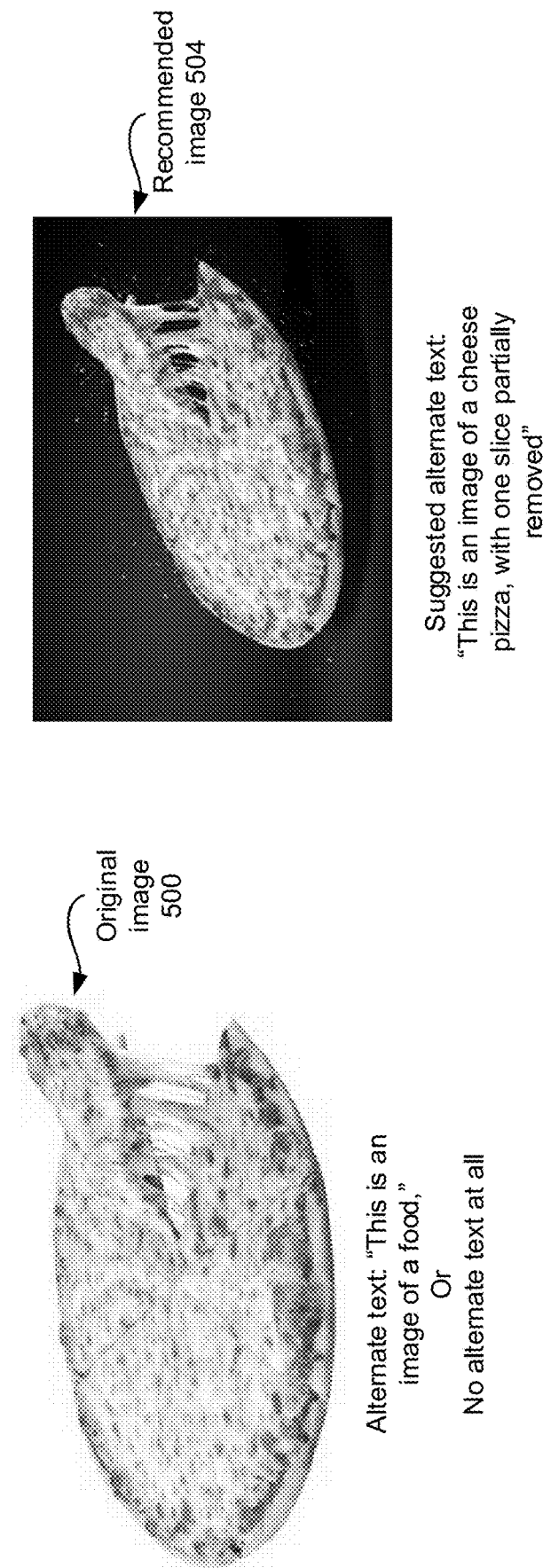
FIG. 5 illustrates images depicting various operations discussed with respect to the example methodology of FIG. 3B, in accordance with some embodiments of the present disclosure.

Referring again to the method 300 of FIG. 3A, operations in the block 320 include providing, by the suggestion module, one or more correction options to correct one or more violations. Some examples of how the suggestion module 110 provides such correction options have been discussed with respect to the method 300 of FIG. 3A. FIG. 3B provides additional examples of how the suggestion module 110 provides such correction options. Thus, FIG. 3B is a flowchart illustrating an example method 320 for providing one or more correction options to correct one or more violations of accessibility guidelines, in accordance with some embodiments of the present disclosure. Thus, the method 320 of FIG. 3B provides additional example implementation of the operations 320 of the method 300 of FIG. 3A. FIG. 5 illustrates example images used for discussion of the method 320 of FIG. 3B, in accordance with some embodiments of the present disclosure. FIGS. 3B and 5 will be discussed in unison herein.

Referring to FIG. 3B, the method 320 comprises, at 320a, accessing digital content, such as the digital content 426 discussed with respect to FIGS. 4A-4G, or any other digital content, as further discussed with respect to the method 300 of FIG. 3A. For example, the accessed digital content may include an original image 500 of FIG. 5, which is an image of a pizza.

The method 320 then proceeds from 320a to 320b. At 320b, the system 102 (such as the image and content analysis module 112 of the system 102, illustrated in FIGS. 1 and 2) performs image recognition operations, to identify one or more components within an image of the digital content. In the context of image 500 of FIG. 5, the system 102 can recognize that the image 500 includes a pizza, such as a cheese pizza, with one slice partially removed.

The method 320 then proceeds from 320b to 320c. At 320c, the system 102 (such as the image and content analysis module 112 of the system 102, illustrated in FIGS. 1 and 2) generates one or more keywords associated with the image, based on identifying the one or more components within the image. For example, in the context of image 500 of FIG. 5, the system 102 generates one or more keywords, such as pizza, cheese pizza, a cheese pizza with a slice partially removed, and/or food.

The method 320 then proceeds from 320c to 320d. At 320d, the system 102 (such as the violation determination module 106 and/or the image and content analysis module 112 of the system 102, illustrated in FIGS. 1 and 2) identifies that the original image and/or alternate text associated with the original image violates accessibility guidelines, scores lower than a threshold accessibility score, and/or scores lower than a threshold viewable score. Merely as an example, the pizza in original the image 500 has a white background, which may make the original image 500 bit dull and unattractive (or un-alluring) to an average user, thereby resulting in a lower viewable score. The viewable score may be an indication of how attractive or viewable the image is to an average user. In some examples, the original image 500 having a white background can also violate a corresponding accessibility guideline, or lower the accessibility score. In some examples, the original image 500 has a lower resolution and/or a smaller size, which can violate an accessibility guideline and/or can lower the accessibility score and/or the viewable score. In some examples, the original image has texts written on the image, which can decrease a viewability of the written texts and/or viewability of the image. In some examples, due to one or more of the above discussed factors, it may be desirable to replace the original image 500 with an alternative image.

In some embodiments, an alternate text (which the text-to-speech uses to aurally describe the image) associated with the image 500 can be deficient. For example, the alternate text may not include the keywords identified at 320c. Merely as an example and as illustrated in FIG. 5, the alternate text for the image 500 can be "This is an image of a food," and may not include "pizza," which is a keyword associated with the image 500. In some other embodiments and as also illustrated in FIG. 5, the image 500 may not have any alternate text associated with it. As discussed and illustrated in FIG. 5, at 320d, the system 102 identifies such deficiencies in the alternate text associated with the image.

In FIG. 3B, the block 320d is illustrated to occur subsequent to an occurrence of the blocks 320b, 320c. However, in some other examples, operations of the block 320d can occur prior to the operations of the block 320b, or prior to the operations of the block 320c. In some such examples, the image recognition operation of block 320b and/or generation of the key words of block 320c are performed based on the identification operations of block 320d.

In some embodiments, the image and content analysis module 112 comprises a machine learning module, such as a trained neural network. For example, the neural network is pre-trained to analyze images and identify components within the images. Any appropriate neural network capable of image identification can be used. The neural network can also be pre-trained and used to generate keywords for an image, and/or recommend images and/or alternate texts to replace the original image and/or the original alternate text, as discussed herein.

The method 320 then proceeds from 320d to 320e. At 320d, the system 102 (such as the suggestion module 110) recommends, based on the one or more key words, one or more images to replace the original image and/or alternate text to be associated with the image. For example, the suggestion module 110 comprises a neural network that is pre-trained to recommend images and/or alternate texts, based on the one or more key words. The suggestion module 110 searches one or more image databases to find a recommended image 504 illustrated in FIG. 5, which can be used as an alternative to the original image 500. In another example, the suggestion module 110 generates and recommends descriptive alternate texts using the generated keywords. For example, FIG. 5 provides an example alternate text as: "This is an image of a cheese pizza, with one slice partially removed," as illustrated in FIG. 5.

In some embodiments, an accessibility score and/or a viewable score associated with the recommend image and/or the recommended alternate texts are higher than those generated at block 320d for the original image and/or the original alternate texts. For example, the accessibility score and/or the viewable score associated with the recommend image and/or the recommended alternate texts are high enough to meet the thresholds for these scores.

The recommended image 504 and/or the recommended alternate text, as illustrated in FIG. 5, can be presented to a developer of the codes, and the developer can choose to select the recommended image and/or text, or choose to use the original image and/or original alternate text, as discussed with respect to the method 300 of FIG. 3A and the UIs of FIGS. 4E-4G. Although FIG. 5 illustrates merely one recommended image 504, in some other examples, the system 102 can recommend multiple images, and the developer can select one of such multiple recommendations, or even choose to use the original image 500 instead.

In some instances, if the developer selects the recommended image and/or the recommended alternate text, in some such examples, the system 102 alters the associated codes, to reflect the new image and/or new alternate text, as discussed with respect to FIGS. 4F and 4G. In some other instances, the developer can choose to use the original image 500 and/or the original alternate text instead, in which case the system 102 does not alter the associated codes.

Thus, in summary, as discussed herein, the methods 300 and 320 improve on the accessibility of the digital content 426. In some examples, the codes to be tested can reside at any source, such as stored locally or remotely, or can even be copied and pasted within the UI of the system 102. In some other examples, the codes to be tested can also be imported from a coding software application. In some other examples, the developer provides the system 102 with a website URL, and the system 102 can access the codes to be tested from the URL. In some examples and referring to FIGS. 4A-4G, the initial version of the digital content 426 has several violations of the accessibility guidelines. The system 102 checks for compliance of the digital content 426 towards each of the accessibility guidelines, such as accessibility guidelines WCAG 2.1 and/or the guidelines discussed with respect to Table 1. The system 102 flags one or more possible violations to the accessibility guidelines. As discussed herein, in some examples, the system 102 provides a detailed report on the violations, which also includes an accessibility score for the violations. The report can be downloaded by the developer. Additionally, the system 102 allows the developer the view the current version of the digital content, the accessibility score, the violations, and options to correct the violations in corresponding different areas of the same UI. In some such examples, the system 102 further allows the developer to decide on a selection of correction options to correct the violations. For example, an auto-selection option would allow the system 102 to automatically choose one or more system-recommended correction options to correct the different violations, and then the system 102 automatically alters the associated codes using the system-recommended correction options. In another example, a manual selection option allows the developer to manually select correction options to alter the codes, and then the system 102 automatically alters the code based on the developer-selected correction options, thereby correcting the different violations. A correction option, for example, comprises one or more attributes that, when used to replace corresponding original attributes within the code, would correct a corresponding violation. Irrespective of whether the developer selects the auto-selection or the manual selection option, the codes are automatically altered by the system (i.e., the developer does not have to manually alter the codes), either using the system-recommended correction options or the developer-selected correction options. Thus, the developer can use the system 102 to not only check for violations of various accessibility guidelines, but to also correct the violations using the same system. Accordingly, the developer does not need to painstakingly go through the entire code to correct the violations—rather, the system 102 corrects the violations using attributes auto-selected by the system and/or attributes selected manually by the developer.

Figure 3C:
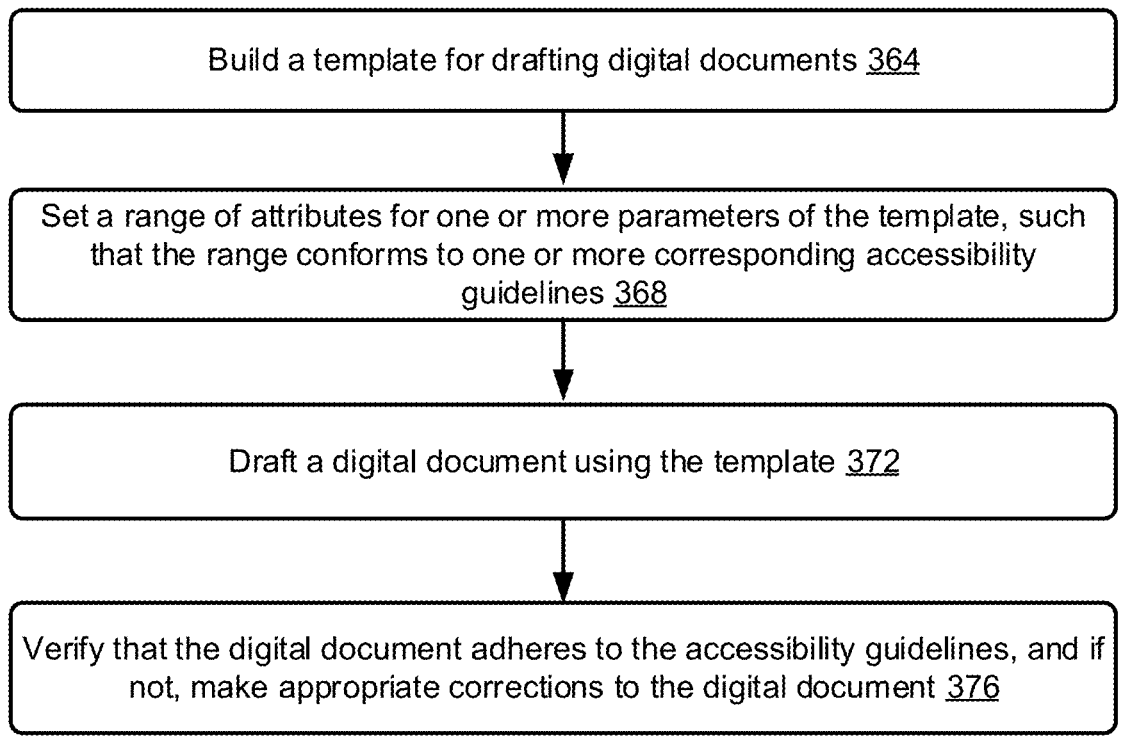
FIG. 3C is a flowchart illustrating an example methodology for creating an accessibility guideline compliant template for drafting digital documents, in accordance with some embodiments of the present disclosure.

FIG. 3C is a flowchart illustrating an example method 360 for creating an accessibility guidelines compliant template for drafting digital documents, in accordance with some embodiments of the present disclosure. Method 360 can be implemented, for example, using the system architecture illustrated in FIGS. 1 and/or 2, and described herein. However other system architectures can be used in other embodiments, as apparent in light of this disclosure. To this end, the correlation of the various functions shown in FIG. 3C to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. Although various operations of the method 300 are discussed herein as being performed by the accessibility verification and correction system 102 of the computing device 100, one or more of these operations can also be performed by the accessibility verification and correction system 202 of the server 201 as well.

At 364 of the method 360, the system 102 (such as the template building module 118 of the system 102, illustrated in FIGS. 1 and 2) builds or generates a template for drafting digital documents. According to an embodiment, the template includes space-holder components, such as empty textboxes and forms, and space for inserting images. In any such cases, a user can use the template to draft a digital document that meets a given set of accessibility guidelines. The template can be used, for example, for drafting marketing emails, marketing brochures, web pages, or any other digital content to be consumed by an audience that may include consumers that can benefit from such accessibility. The developer can generate many different templates, each having its unique layout. When a user is to draft a digital document, the user can select from one of these layouts, and use the corresponding template to draft an accessibility-compliant digital document.

The method 360 then proceeds from 364 to 368, where the system 102 (such as the template building module 118) sets a range of attributes for one or more parameters of the template, such that the range conforms to one or more corresponding accessibility guidelines. The accessibility guidelines used can be any appropriate accessibility guidelines, such as WCAG accessibility guidelines (e.g., WCAG 2.1 accessibility guidelines, or any versions thereof).

For example, as discussed with respect to FIG. 4D, a line spacing less than 1.0 can violate an accessibility guideline. So, the line spacing parameter in the template can be set to have a minimum value of 1.0, and a user using the template to draft a digital document cannot select a line spacing of less than 1.0. Accordingly, digital documents drafted using this template cannot have the violation 438b of FIG. 4D.

In another example, the template can set a minimum font size for texts within the digital documents, a slightly larger minimum font size for headings, and so on, in accordance with corresponding accessibility guidelines. Thus, any digital documents drafted using the template must adhere to such minimum font sizes, thereby ensuring that the digital documents comply with the corresponding accessibility guidelines associated with font size.

In yet another example, the template can have different types of buttons that can be inserted into a digital document to be later drafted, and the template can have a rule to prevent creation of a button without discernable text. That is, whenever a button is to be created in a digital document using the template, the user also has to provide corresponding discernable text—without such discernable text, the template may output an error when the button is being created. Accordingly, digital documents drafted using this template cannot have the violation 438a of FIG. 4D.

After the template is built, a user can use the template to draft digital documents, as indicated by block 372 of the method 360. For example, the user can populate the spaceholder text block of the template with texts of digital content being drafted. As discussed, the template has attributes that adhere to the accessibility guidelines, and hence, the digital document drafted using the template also adheres to the accessibility guidelines.

The method 360 then proceeds to 376, where the system 102 verifies that the drafted digital document adheres to the accessibility guidelines, as discussed with respect to the method 300 of FIG. 3A. If the drafted digital document does not adhere to one or more accessibility guidelines, the system 102 makes appropriate corrections to the digital document to make it compliant with the accessibility guidelines, as also discussed with respect to the method 300 of FIG. 3A.

Thus, when a user uses the template of method 360 to draft a digital document, the digital document most likely is to adhere to the accessibility guidelines. The template for creating digital documents pre-checks the accessibility guidelines, and ensures that the digital documents created using the template will most likely adhere to the accessibility guidelines. This significantly decreases the time and/or resource needed for a user to verify and/or correct adherence of the digital document to the accessibility guidelines, thereby creating better user experience.

Numerous variations and configurations will be apparent in light of this disclosure and the following examples.

Example 1. A method for increasing accessibility of digital content, the method comprising: accessing, by a code access module, a code for digital content and an accessibility guideline, wherein the code defines one or more aspects of how the digital content is to be presented, and the accessibility guideline is a rule with which the presentation of the digital content is to comply; analyzing, by a violation determination module, the code to identify a violation of the accessibility guideline; causing display of (i) the digital content presented in accordance with the code on a first area of a User Interface (UI), (ii) data indicative of the violation on a second area of the UI, and (iii) an option to correct the violation on a third area of the UI; in response to receiving an input indicative of a selection of the option to correct the violation, providing, by a suggestion module, one or more correction options to correct the violation; and in response to receiving a selection of a correction option, altering, by a correction module, the code based on the selected correction option, to correct the violation of the accessibility guideline and thereby change one or more aspects of how the digital content is to be presented.

Example 2. The method of example 1, further comprising: calculating, by a scoring module and prior to altering the code, an accessibility score indicative of a severity of the violation; and causing display of the accessibility score on a fourth area of the UI.

Example 3. The method of example 2, wherein in response to altering the code, the method further comprises: updating, by the scoring module, the accessibility score to reflect the altered code; and causing display of the updated accessibility score on the fourth area of the UI.

Example 4. The method of any of examples 2-3, wherein the violation is a first violation, wherein the accessibility guideline is a first accessibility guideline, and wherein the method further comprising: analyzing the code to identify, within the digital content, a second violation of a second accessibility guideline; and assigning a first severity category to the first violation and a second severity category to the second violation, wherein calculating the accessibility score comprises weighting the first violation differently from the second violation, based on the first severity category of the first violation being different from the second severity category of the second violation.

Example 5. The method of any of examples 1-4, wherein the correction option comprises one or more attributes that, when used to replace corresponding original attributes within the pre-altered version of the code, correct the violation.

Example 6. The method of any of examples 1-5, wherein accessing the codes comprises at least one of: (i) accessing the codes by accessing a file storing the codes; and/or (ii) (a) receiving a link or a Uniform Resource Locator (URL) that identifies a web page, wherein the webpage comprises the digital content, and (b) retrieving the code associated with the web page.

Example 7. The method of any of examples 1-6, wherein altering the code comprises: automatically altering the code, in response to receiving the selection of the correction option, without waiting for a user to manually alter the code with the correction option.

Example 8. The method of any of examples 1-7, wherein providing the one or more correction options to correct the violation comprises: providing (i) a plurality of correction options, from which one correction option is selectable by a user, and/or (ii) providing a single recommended correction option.

Example 9. The method of example 8, wherein the digital content comprises a first image, and wherein providing the recommended correction option comprises: analyzing the first image to recognize one or more components within the first image; generating one or more keywords, based on recognizing the one or more components; searching an image database to identify a second image, based on the one or more keywords; and providing the second image as a recommended correction option, to replace the first image with the second image.

Example 10. The method of example 8, wherein the digital content comprises an image that (i) either is associated with an original alternate text that violates the accessibility guideline, (ii) or is not associated with any alternate text, and wherein providing the recommended correction option comprises: analyzing the image to recognize one or more components within the image; generating one or more keywords, based on recognizing the one or more components; generating a first alternate text for the image, based on the one or more keywords, wherein the first alternate text is to be read out, in lieu of the image, by a text-to-speech synthesizer when the digital content is to be presented; and providing the first alternate text as the recommended correction option.

Example 11. The method of any of examples 1-10, wherein the violation is a first violation, the accessibility guideline is a first accessibility guideline, the correction option is a first correction option, and wherein the method further comprises: analyzing the code to identify a second violation of a second accessibility guideline; receiving a selection of an auto-select option, wherein the auto-select option involves automatically selecting one or more correction options to correct the second violation; identify a second correction option to correct the second violation; and altering the code based on the second correction option, to correct the second violation of the second accessibility guideline, without receiving a selection of the second correction option from the user.

Example 12. The method of any of examples 1-11, further comprising: subsequent to altering the code, causing display of the digital content presented in accordance with the altered code on the first area of the UI, wherein the digital content presented in accordance with the altered code does not incur the first violation.

Example 13. The method of any of examples 1-12, wherein at least one of: the code is in accordance with the Hypertext Markup Language (HTML); and/or the accessibility guideline is a part of the Web Content Accessibility Guidelines (WCAG) published by the Web Accessibility Initiative (WAI).

Example 14. A system for improving accessibility options of digital content, the system comprising: one or more processors; a code access module executable by the one or more processors to access digital content and a plurality of accessibility guidelines; an image analysis module executable by the one or more processors to (i) assign a first accessibility score to a first image within the digital content, wherein the first accessibility score is indicative of a level of conformance of the first image to one or more of the plurality of accessibility guidelines, (ii) in response to the first accessibility score being lower than a threshold value, perform an image recognition operation on the first image to identify one or more objects within the first image, and (iii) generate one or more keywords associated with the one or more objects; a suggestion module executable by the one or more processors to (i) search a plurality of images using the one or more keywords, and (ii) select a second image from the plurality of images, wherein a second accessibility score associated with the second image is higher than the first accessibility score associated with the first image; and a correction module executable by the one or more processors to (i) provide an option to replace the first image with the second image, and (ii) in response to receiving a selection of the option, replace the first image with the second image within the digital content.

Example 15. The system of example 14, wherein: the image analysis module is to identify that the first image lacks any alternate text; the suggestion module is to generate an alternate text, based at least in part on the one or more keywords, wherein the alternate text is to be read out, in lieu of the first or second image, by a text-to-speech synthesizer when the digital content is to be presented; and the correction module is to provide an option to associate the alternate text with the first image or the selected second image.

Example 16. The system of any of examples 14-15, wherein the image analysis module is implemented using a machine learning module trained to identify content of images.

Example 17. A computer program product including one or more non-transitory machine-readable mediums encoded with instructions that when executed by one or more processors cause a process to be carried out for increasing accessibility of digital content, the process comprising: accessing (i) a code for digital content and (ii) an accessibility guideline; analyzing the code to identify that the digital content is to violate the accessibility guideline, when the digital content is to be presented in accordance with the code; calculating, by a scoring module, an accessibility score indicative of a severity of the violation; causing display of an option to correct the violation and the accessibility score; identifying a correction option to correct the violation; altering the code based on the correction option; and updating the accessibility score, to indicate how the altered code changes the accessibility score.

Example 18. The computer program product of example 17, wherein: the correction option is a first correction option; identifying the first correction option comprises identifying a plurality of correction options; and altering the code comprises receiving an input indicative of a selection of the first correction option among the plurality of correction options, and altering the code based on the selection of the first correction option.

Example 19. The computer program product of any of examples 17-18, wherein altering the code based on the correction option comprises: receiving a selection of an auto-select option from a user; and altering the code using the correction option, without receiving an input from the user indicating a selection of the correction option among a plurality of correction options.

Example 20. The computer program product of any of examples 17-19, wherein the code is a Hypertext Markup Language (HTML) code, and wherein the accessibility guideline is a part of the Web Content Accessibility Guidelines (WCAG) published by the Web Accessibility Initiative (WAI).

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for increasing accessibility of digital content, the method comprising:
   accessing, by a code access module, a code for digital content and an accessibility guideline, wherein the code comprises machine-readable rendering instructions that, when processed, cause the digital content to be presented with a particular visual appearance, wherein the code includes an initial value assigned to an attribute, and wherein the accessibility guideline is a rule with which the particular visual appearance of the digital content is to comply;
   analyzing, by a violation determination module, the code to identify a violation of the accessibility guideline by the particular visual appearance;
   generating a first correction option comprising a first replacement value that, when assigned to the attribute, causes the code to render the digital content with a first modified visual appearance that complies with the accessibility guideline;
   generating a second correction option comprising a second replacement value that, when assigned to the attribute, causes the code to render the digital content with a second modified visual appearance that complies with the accessibility guideline;
   causing simultaneous display of (i) the digital content presented in accordance with the code on a first area of a User Interface (UI), (ii) data indicative of the violation on a second area of the UI, and (iii) a user-selectable option to select amongst at least the first and second correction options on a third area of the UI;
   receiving first user input indicative of a manual selection of the first correction option; and
   in response to receiving the first user input, assigning, by a correction module, the first replacement value to the attribute, thereby generating altered code that comprises machine-readable instructions that, when processed, cause the digital content to be presented with the first modified visual appearance that complies with the accessibility guideline.

2. The method of claim 1, further comprising:
   calculating, by a scoring module and prior to generating the altered code, an accessibility score indicative of a severity of the violation; and
   causing display of the accessibility score on a fourth area of the UI.

3. The method of claim 2, wherein in response to generating the altered code, the method further comprises:
   updating, by the scoring module, the accessibility score to reflect the altered code; and
   causing display of the updated accessibility score on the fourth area of the UI.

4. The method of claim 2, wherein the violation is a first violation, and wherein the accessibility guideline is a first accessibility guideline, the method further comprising:
   analyzing the code to identify, within the digital content, a second violation of a second accessibility guideline; and
   assigning a first severity category to the first violation and a second severity category to the second violation,
   wherein calculating the accessibility score comprises weighting the first violation differently from the second violation, based on the first severity category of the first violation being different from the second severity category of the second violation.

5. The method of claim 1, wherein the attribute is a line spacing of text included in the digital content, wherein the initial value is a first line spacing, and wherein the first replacement value is a second line spacing that is greater than the first line spacing.

6. The method of claim 1, wherein accessing the code comprises at least one of:
   (i) accessing the code by accessing a file storing the code; and/or
   (ii) (a) receiving a link or a Uniform Resource Locator (URL) that identifies a webpage, wherein the webpage comprises the digital content, and (b) retrieving the code associated with the webpage.

7. The method of claim 1, wherein the violation is a first violation, and wherein the method further comprises:
   analyzing the code to identify, within the digital content, a second violation of the accessibility guideline; and
   receiving second user input indicative of a further modification to the altered code; and
   generating further altered code that comprises machine-readable instructions that, when processed, cause the digital content to be presented with a third modified visual appearance that resolves the first and second violations and complies with the accessibility guideline.

8. The method of claim 1, wherein the user-selectable option comprises a menu that includes at least the first and second replacement values.

9. The method of claim 1, wherein the digital content comprises a first image, and wherein the method further comprises:
   analyzing the first image to recognize one or more components within the first image;
   generating one or more keywords, based on recognizing the one or more components;
   searching an image database to identify a second image, based on the one or more keywords; and
   providing the second image as a recommended correction option for replacing the first image.

10. The method of claim 1, wherein the digital content comprises an image that is either (i) associated with an original alternate text that violates the accessibility guideline, or (ii) not associated with any alternate text, and wherein the method further comprises:
    analyzing the image to recognize one or more components within the image;
    generating one or more keywords, based on recognizing the one or more components;
    generating a first alternate text for the image, based on the one or more keywords, wherein the first alternate text is to be read out, in lieu of the image, by a text-to-speech synthesizer when the digital content is to be presented; and
    providing the first alternate text as a recommended correction option.

11. The method of claim 1, wherein the violation is a first violation, wherein the accessibility guideline is a first accessibility guideline, and wherein the method further comprises:
    analyzing the code to identify a second violation of a second accessibility guideline;
    receiving a selection of an auto-select option, wherein the auto-select option involves automatically selecting an automated correction option to correct the second violation;
    identifying the automated correction option to correct the second violation; and
    further altering the altered code based on the automated correction option, thereby generating further altered code that comprises machine-readable instructions that, when processed, cause the digital content to be presented with a third modified visual appearance that complies with the first accessibility guideline and the second accessibility guideline.

12. The method of claim 1, further comprising:
subsequent to generating the altered code, causing the digital content to be presented with the first modified visual appearance on the first area of the UI.

13. The method of claim 1, wherein at least one of:
the code is in accordance with Hypertext Markup Language (HTML); and/or
the accessibility guideline is a part of Web Content Accessibility Guidelines (WCAG) published by Web Accessibility Initiative (WAI).

14. A system for improving accessibility options for digital content, the system comprising:
one or more processors;
a code access module, executable by the one or more processors, to access a code for digital content and an accessibility guideline, wherein the code comprises machine-readable rendering instructions that, when processed, cause the digital content to be presented with a particular visual appearance, wherein the code includes an initial value assigned to an attribute, and wherein the accessibility guideline is a rule with which the particular visual appearance of the digital content is to comply;
a violation determination module, executable by the one or more processors, to analyze the code to identify a violation of the accessibility guideline by the particular visual appearance;
a suggestion module, executable by the one or more processors, to generate a first correction option comprising a first replacement value that, when assigned to the attribute, causes the code to render the digital content with a first modified visual appearance that complies with the accessibility guideline,
generate a second correction option comprising a second replacement value that, when assigned to the attribute, causes the code to render the digital content with a second modified visual appearance that complies with the accessibility guideline, and
cause simultaneous display of (i) the digital content presented in accordance with the code on a first area of a User Interface (UI), (ii) data indicative of the violation on a second area of the UI, and (iii) a user-selectable option to select amongst at least the first and second correction options on a third area of the UI; and
a correction module, executable by the one or more processors, to
receive user input indicative of a manual selection of the first correction option, and
in response to receiving the user input, assign the first replacement value to the attribute, thereby generating altered code that comprises machine-readable instructions that, when processed, cause the digital content to be presented with the first modified visual appearance that complies with the accessibility guideline.

15. The system of claim 14, further comprising a scoring module, executable by the one or more processors, to:
calculate, before generating the altered code, an accessibility score indicative of a severity of the violation; and
cause display of the accessibility score on a fourth area of the UI.

16. The system of claim 15, wherein the scoring module is further executable by the one or more processors to:
update the accessibility score to reflect the altered code; and
cause display of the updated accessibility score on the fourth area of the UI.

17. The system of claim 15, wherein:
the violation is a first violation;
the accessibility guideline is a first accessibility guideline;
the violation determination module is further configured to analyze the code to identify, within the digital content, a second violation of a second accessibility guideline;
the scoring module is further configured to assign a first severity category to the first violation and a second severity category to the second violation; and
calculating the accessibility score comprises weighting the first violation differently from the second violation, based on the first severity category of the first violation being different from the second severity category of the second violation.

18. The system of claim 14, wherein the attribute is a line spacing of text included in the digital content, wherein the initial value is a first line spacing, and wherein the first replacement value is a second line spacing that is greater than the first line spacing.

19. A computer program product including one or more non-transitory machine-readable mediums encoded with instructions that when executed by one or more processors cause a process to be carried out for increasing accessibility of digital content, the process comprising:
accessing a code for digital content and an accessibility guideline, wherein the code comprises machine-readable rendering instructions that, when processed, cause the digital content to be presented with a particular visual appearance, wherein the code includes an initial value assigned to an attribute, and wherein the accessibility guideline is a rule with which the particular visual appearance of the digital content is to comply;
analyzing the code to identify a violation of the accessibility guideline by the particular visual appearance;
generating a first correction option comprising a first replacement value that, when assigned to the attribute, causes the code to render the digital content with a first modified visual appearance that complies with the accessibility guideline;
generating a second correction option comprising a second replacement value that, when assigned to the attribute, causes the code to render the digital content with a second modified visual appearance that complies with the accessibility guideline;
causing simultaneous display of (i) the digital content presented in accordance with the code on a first area of a User Interface (UI), (ii) data indicative of the violation on a second area of the UI, and (iii) a user-selectable option to select amongst at least the first and second correction options on a third area of the UI;
receiving user input indicative of a manual selection of the first correction option; and
in response to receiving the user input, assigning the first replacement value to the attribute, thereby generating altered code that comprises machine-readable instructions that, when processed, cause the digital content to be presented with the first modified visual appearance that complies with the accessibility guideline.

20. The computer program product of claim 19, wherein the process further comprises, after generating the altered code, causing the digital content to be presented with the first modified visual appearance on the first area of the UI.

\* \* \* \* \*